US012297085B2

(12) United States Patent
Shirai et al.

(10) Patent No.: US 12,297,085 B2
(45) Date of Patent: May 13, 2025

(54) WORK MACHINE

(71) Applicant: TADANO LTD., Kagawa (JP)

(72) Inventors: Manato Shirai, Kagawa (JP); Kazu Nagahama, Kagawa (JP); Masahide Zushi, Kagawa (JP)

(73) Assignee: TADANO LTD., Kagawa (JP)

( * ) Notice: Subject to any disclaimer, the term of this patent is extended or adjusted under 35 U.S.C. 154(b) by 350 days.

(21) Appl. No.: 17/631,710

(22) PCT Filed: Aug. 21, 2020

(86) PCT No.: PCT/JP2020/031668

§ 371 (c)(1),
(2) Date: Jan. 31, 2022

(87) PCT Pub. No.: WO2021/033772

PCT Pub. Date: Feb. 25, 2021

(65) Prior Publication Data

US 2022/0267120 A1 Aug. 25, 2022

(30) Foreign Application Priority Data

Aug. 21, 2019 (JP) ................................ 2019-151528

(51) Int. Cl.
*B66C 23/70* (2006.01)

(52) U.S. Cl.
CPC .......... *B66C 23/708* (2013.01); *B66C 23/702* (2013.01)

(58) Field of Classification Search
CPC ..... B66C 23/70; B66C 23/701; B66C 23/702; B66C 23/705; B66C 23/706;
(Continued)

(56) References Cited

U.S. PATENT DOCUMENTS 4,298,128 A 11/1981 Gattu
6,474,486 B1 * 11/2002 Baraniak .............. B66C 23/705 212/292
(Continued)

FOREIGN PATENT DOCUMENTS

CN 106185628 A * 12/2016
CN 208479367 U 2/2019
(Continued)

OTHER PUBLICATIONS

Sep. 29, 2020, International Search Report issued for related PCT application No. PCT/JP2020/031668.
(Continued)

*Primary Examiner* — Anna M Momper
*Assistant Examiner* — Henrix Soto
(74) *Attorney, Agent, or Firm* — Paratus Law Group, PLLC

(57) ABSTRACT

The work machine includes: a telescoping actuator that moves a first boom in the telescoping direction with respect to a second boom; an electrical drive source that is disposed in a movable portion of the telescoping actuator; a first connection mechanism that switches a connection state between the telescoping actuator and the first boom on the basis of the power of the electrical drive source; a second connection mechanism that switches a connection state between the first boom and the second boom on the basis of the power of the electrical drive source; and a torque limiter that is disposed between the electrical drive source and the first connection mechanism or the second connection mechanism, the torque limiter maintaining, at a predetermined value or less, a load acting on a mechanical element constituting a power transmission path from the electrical drive source.

4 Claims, 18 Drawing Sheets

(58) Field of Classification Search
CPC ..... B66C 23/708; B66C 23/04; B66C 23/305; B66C 23/42; B66C 23/66; B66C 2700/084; B66C 2700/085
USPC .......................................................... 212/347
See application file for complete search history.

(56) References Cited

U.S. PATENT DOCUMENTS

| | | | | |
|---|---|---|---|---|
| 6,575,318 | B2 * | 6/2003 | Stowasser | B66C 23/705 212/292 |
| 8,668,235 | B2 * | 3/2014 | Mills | B66C 1/101 294/81.51 |
| 8,746,101 | B2 * | 6/2014 | Hausladen | F16H 35/10 464/33 |
| 9,868,617 | B2 * | 1/2018 | Ikeda | B66C 13/20 |

FOREIGN PATENT DOCUMENTS

| | | | | | |
|---|---|---|---|---|---|
| DE | 202008007902 | U1 | * | 12/2009 | B66C 23/705 |
| JP | 2012-096928 | A | | 5/2012 | |
| JP | 2017159973 | A | * | 9/2017 | |
| KR | 100267456 | B1 | * | 7/1998 | |
| KR | 100403765 | B1 | * | 10/2003 | |
| KR | 100425394 | B1 | * | 3/2004 | |

OTHER PUBLICATIONS

Sep. 29, 2020, International Search Opinion issued for related PCT application No. PCT/JP2020/031668.

Apr. 25, 2022, Indian Examination Report issued for related IN application No. 202217007868.

* cited by examiner

WORK MACHINE

CROSS REFERENCE TO PRIOR APPLICATION

This application is a National Stage Patent Application of PCT International Patent Application No. PCT/JP2020/031668 (filed on Aug. 21, 2020) under 35 U.S.C. § 371, which claims priority to Japanese Patent Application No. 2019-151528 (filed on Aug. 21, 2019), which are all hereby incorporated by reference in their entirety.

TECHNICAL FIELD

The present invention relates to a work machine including a telescopic boom.

BACKGROUND ART

Conventionally, there is known a mobile crane including a telescopic boom in which a plurality of boom elements is disposed while being overlapped in a nested manner (also referred to as a telescopic manner) (see, for example, Patent Literature 1). The telescopic boom is configured to be telescopic stage by stage, for example, by a telescoping actuator disposed inside the innermost boom element.

Specifically, in the telescopic boom, boom elements adjacent to each other inside and outside are connected to each other by a boom-connecting pin (hereinafter, referred to as the “B pin”). When connection by the B pin is released, a boom element on an inner side is movable in a telescoping direction with respect to a boom element on an outer side. The movable boom element is connected to a movable portion of the telescoping actuator by a cylinder-connecting pin (hereinafter, referred to as the “C pin”). The telescoping actuator includes, for example, a hydraulic cylinder having a piston rod part and a cylinder part, and the cylinder part functions as a movable portion to telescope the boom element.

In addition, the insertion and removal operation of the B pin and the C pin is exclusively controlled by a pin insertion/removal actuator provided in the movable portion of the telescoping actuator, and a connection state between the boom elements by the B pin and a connection state between the cylinder and the boom by the C pin are not simultaneously released (so-called interlock).

CITATION LIST

Patent Literature

Patent Literature 1: JP 2012-96928 A

SUMMARY OF THE INVENTION

Problems to be Solved by the Invention

Incidentally, a hydraulic actuator is conventionally used as the pin insertion/removal actuator, and a pipe and a hydraulic circuit for supplying hydraulic oil to the actuator are provided around the telescopic boom. For this reason, design around the telescopic boom may be spatially limited, and this limitation in the design may restrict downsizing and light-weighting of the telescopic boom.

In addition, since the viscosity of the hydraulic oil varies according to environmental temperature or the like, operation time is unstable, and there is a large influence particularly in low temperature environments, which causes malfunction.

An object of the present invention is to provide a work machine that allows an improvement in the degree of freedom in terms of design around a telescopic boom and an increase in the reliability when the boom is telescoping.

Solutions to Problems

A work machine according to the present invention includes:

- a telescopic boom having a first boom and a second boom that are telescopically overlapped;
- a telescoping actuator that moves the first boom in a telescoping direction with respect to the second boom;
- an electrical drive source provided in a movable portion of the telescoping actuator;
- a first fixing pin that connects the telescoping actuator and the first boom;
- a first connection mechanism that operates on the basis of the power of the electrical drive source and switches between a connection state and a disconnection state between the telescoping actuator and the first boom by inserting and removing the first fixing pin;
- a second fixing pin that connects the first boom and the second boom;
- a second connection mechanism that operates on the basis of the power of the electrical drive source and switches between a connection state and a disconnection state between the first boom and the second boom by inserting and removing the second fixing pin; and
- a torque limiter that is disposed between the electrical drive source and the first connection mechanism or the second connection mechanism, the torque limiter maintaining, at a predetermined value or less, a load acting on a mechanical element constituting a power transmission path from the electrical drive source to the first connection mechanism or the second connection mechanism.

Effects of the Invention

According to the present invention, it is possible to improve the degree of freedom in terms of design around a telescopic boom and increase the reliability when the boom is telescoping.

DESCRIPTION OF EMBODIMENTS

Hereinafter, an embodiment according to the present invention will be described with reference to the drawings. In the present embodiment, a mobile crane 1 that is an example of a work machine according to the present invention will be described.

<Mobile Crane>

Figure 1:
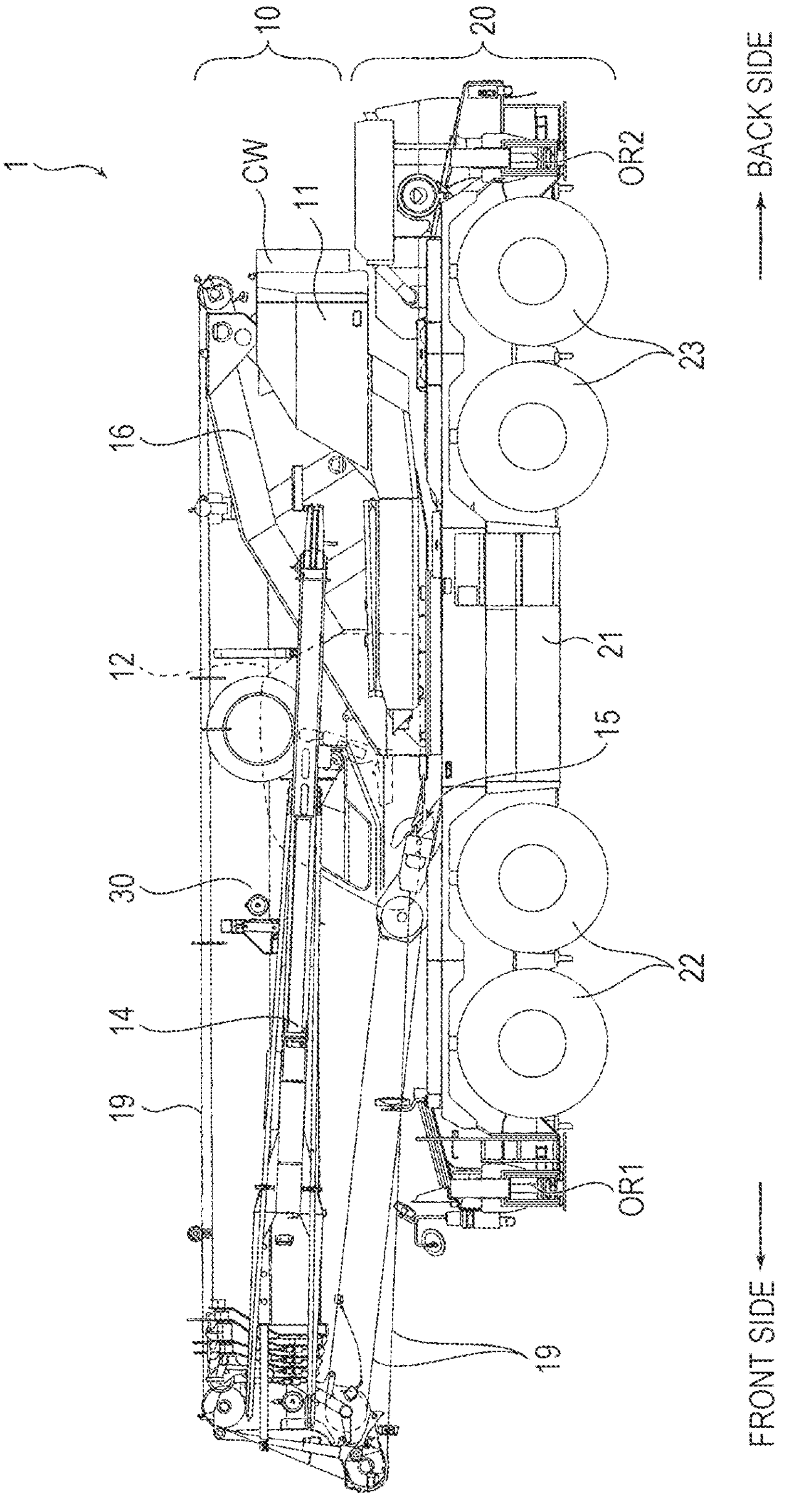
FIG. 1 is a view illustrating a state during traveling of a mobile crane according to an embodiment of the present invention.
Figure 2:
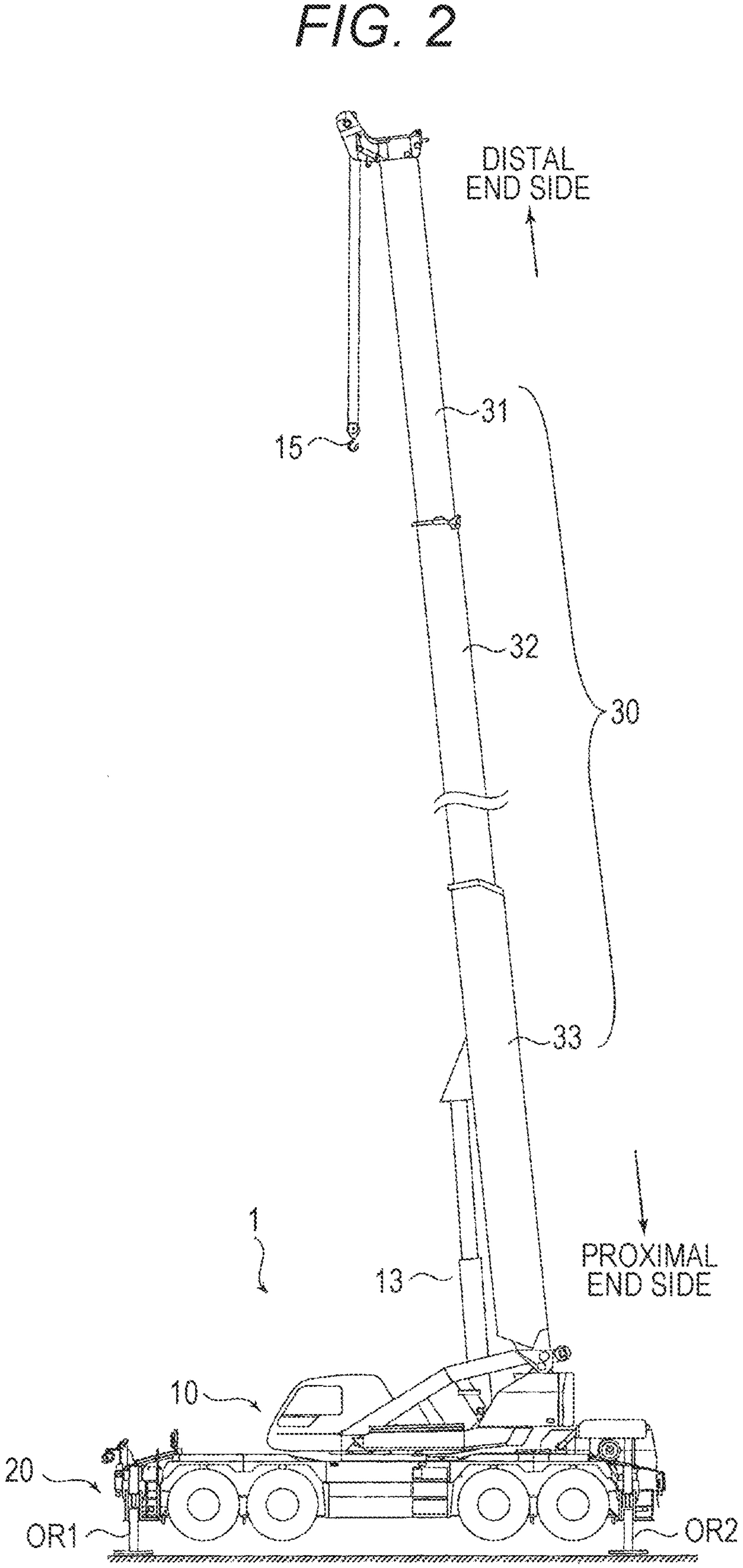
FIG. 2 is a view illustrating a state of the mobile crane during work.

FIG. 1 is a view illustrating a state during traveling of the mobile crane 1 according to an embodiment of the present invention. FIG. 2 is a diagram illustrating a state of the mobile crane 1 during work.

The mobile crane 1 illustrated in FIGS. 1 and 2 is a so-called rough terrain crane including an upper revolving body 10 and a lower traveling body 20.

The upper revolving body 10 includes a revolving frame 11, a cabin 12 (cab), a derricking cylinder 13, a jib 14, a hook 15, a bracket 16, a telescopic boom 30, a counter weight CW, a hoisting device (winch, not illustrated), and the like.

The revolving frame 11 is revolvably supported by the lower traveling body 20 via a revolving suspension (not illustrated). The cabin 12, the derricking cylinder 13, the bracket 16, the telescopic boom 30, the counter weight CW, the hoisting device (not illustrated), and the like are attached to the revolving frame 11.

The cabin 12 is disposed, for example, in front of the revolving frame 11. In the cabin 12, in addition to a seat on which an operator sits and various instruments, an operation part, a display part, a sound output part, and the like used when crane work and travelling operation are performed are disposed.

The derricking cylinder 13 is installed between the revolving frame 11 and the telescopic boom 30. The telescopic boom 30 is derricked within a predetermined derricking angle range (for example, 0° to 84°) by the telescoping of the derricking cylinder 13.

The jib 14 is rotatably attached to a distal end (boom head) of the telescopic boom 30 in a case where a lifting height is increased. The jib 14 is rotated forward, thereby being projected forward from the telescopic boom 30.

The hook 15 is a hanging tool having a hook shape and has a main winding hook and an auxiliary winding hook. The hook 15 is attached to a wire rope 19 wound around a sheave at a distal end part of the telescopic boom 30 or a distal end part of the jib 14. As the wire rope 19 is wound up or paid out by a hoisting device (not illustrated), the hook 15 moves up and down.

The counter weight CW is attached to a rear part of the revolving frame 11. The counter weight CW has a plurality of unit weights and can be set to have different weights depending on a combination of the unit weights.

The telescopic boom 30 is rotatably attached to the bracket 16 via a support shaft (foot pin, reference sign is omitted). The telescopic boom 30 has a plurality of boom elements including a distal end boom 31, an intermediate boom 32, and a proximal end boom 33, and these boom elements are disposed while being overlapped in a nested manner (so-called telescopic structure). A telescoping actuator 40 (see FIG. 5) disposed inside telescopes, whereby the distal end boom 31 and the intermediate boom 32 among the plurality of boom elements slide and telescope in a telescoping direction with respect to the proximal end boom 33. Meanwhile, the proximal end boom 33 is not movable in a telescoping direction. The state of the telescopic boom 30 changes from a contracted state illustrated in FIG. 1 to an extended state illustrated in FIG. 2 by extending the boom elements in order from the boom element disposed on an inner side (that is, the distal end boom 31).

In addition, a boom head (reference sign is omitted) having a sheave (reference sign is omitted) is disposed at a distal end part of the distal end boom 31. In addition, a work attachment such as a bucket may be attached to the boom head. Note that in the telescopic boom 30, the number of stages of the intermediate boom 32 is not particularly limited.

The lower traveling body 20 includes a vehicle body frame 21, wheels 22 and 23, outriggers OR1 and OR2, an engine (not illustrated), and the like.

Driving force of the engine is transmitted to the wheels 22 and 23 via a transmission (not illustrated). The mobile crane 1 travels by the rotation of the wheels 22 and 23 by the driving force of the engine. In addition, steering angles (traveling directions) of the wheels 22 and 23 change in accordance with the operation of a steering wheel (not illustrated) provided in the cabin 12.

The outriggers OR1 and OR2 are housed in the vehicle body frame 21 during traveling. Meanwhile, the outriggers OR1 and OR2 project in a horizontal direction and a vertical direction during work (during the operation of the upper revolving body 10), lift and support the entire vehicle body, and stabilize a posture.

As described above, the mobile crane 1 is a self-travelling crane using the wheels 22 and 23 for a travelling unit of the lower traveling body 20, and travelling operation and crane operation can be performed from one cab.

Note that examples of the mobile crane 1 include an all-terrain crane, a truck crane, and a truck loader crane (also referred to as a cargo crane) in addition to a rough terrain crane.

<Telescopic Boom>

FIGS. 3A to 3C and FIGS. 4A to 4C are schematic views for describing a structure and extending operation of the telescopic boom 30. FIGS. 3A to 3C and FIGS. 4A to 4C are vertical cross sections along a width direction of the telescopic boom 30, the right side in the figures is the proximal end side of the telescopic boom 30, and the left side in the figures is the distal end side of the telescopic boom 30. Here, in order to simplify description, the telescopic boom 30 in which the intermediate boom 32 is of a one-stage composition will be described as an example.

As illustrated in FIGS. 3A to 3C and FIGS. 4A to 4C, the telescopic boom 30 has a configuration substantially similar to a configuration of a conventionally known telescopic boom. The telescopic boom 30 has, for example, a structure symmetrical in the width direction with respect to a telescopic axis. A telescopic device A for telescoping the telescopic boom 30 is disposed inside the telescopic boom 30.

In the telescopic boom 30, the distal end boom 31 and the intermediate boom 32 are connected to each other with a boom-connecting pin (hereinafter, referred to as the "B pin") 315 provided in the distal end boom 31, the intermediate boom 32 and the proximal end boom 33 are connected to each other with a B pin 325 provided in the intermediate boom 32. In addition, each of the distal end boom 31, the intermediate boom 32, and the proximal end boom 33 is connected to the telescoping actuator 40 by a cylinder-connecting pin (hereinafter, referred to as the "C pin") 150. The distal end boom 31 or the intermediate boom 32 connected to the telescoping actuator 40 by the C pin 150 is a boom element to be telescoped.

The distal end boom 31 has a cylindrical shape and has an internal space capable of accommodating the telescopic device A. The distal end boom 31 has a C pin receiving part 311, a B pin holding part 314, and the B pin 315 at a proximal end part.

Each of a pair of the C pin receiving parts 311 is configured to be engageable with and disengageable from the C pin 150 (first fixing pin) provided in a pin insertion/removal actuator 50. The C pin receiving parts 311 are disposed, for example, coaxially with each other.

The B pin holding part 314 is fixed to a frame of the distal end boom 31 on the proximal end side of the C pin receiving part 311 and holds the B pin 315 (second fixing pin) so that the B pin 315 is movable forward and backward. A pair of the B pins 315 is disposed, for example, coaxially at the B pin holding part 314 and is biased in directions opposite to each other toward the intermediate boom 32 on the outer side by the biasing force of a biasing member. That is, in normal times in which the distal end boom 31 is not telescoped, the B pin 315 is inserted into a proximal end side B pin receiving part 322 or a distal end side B pin receiving part 323 of the intermediate boom 32 by the biasing force of the biasing member, and the B pin 315 is maintained in this state.

The intermediate boom 32 has a cylindrical shape and has an internal space capable of accommodating the distal end boom 31. The intermediate boom 32 has a C pin receiving part 321, the proximal end side B pin receiving part 322, and a B pin holding part 324 at a proximal end part and includes the distal end side B pin receiving part 323 at a distal end part.

Each of a pair of the C pin receiving parts 321 is configured to be engageable with and disengageable from the C pin 150 (first fixing pin). The C pin receiving parts 321 are disposed, for example, coaxially with each other.

A pair of the proximal end side B pin receiving parts 322 is provided on the proximal end side of the C pin receiving part 321 and is disposed coaxially with each other. A pair of the distal end side B pin receiving parts 323 is provided at a distal end part of the intermediate boom 32 and disposed coaxially with each other. Each of the proximal end side B pin receiving part 322 and the distal end side B pin receiving part 323 is configured to allow insertion and removal of the B pin 315 of the distal end boom 31.

The B pin holding part 324 is fixed to a frame of the intermediate boom 32 on the proximal end side of the proximal end side B pin receiving part 322, and holds the B pin 325 (second fixing pin) so that the B pin 325 is movable forward and backward. A pair of the B pins 325 is disposed, for example, coaxially at the B pin holding part 324 and is biased in directions opposite to each other toward the proximal end boom 33 on the outer side by the biasing force of the biasing member. That is, in normal times in which the intermediate boom 32 is not telescoped, the B pin 325 is inserted into a proximal end side B pin receiving part 332 or a distal end side B pin receiving part 333 of the proximal end boom 33 by the biasing force of the biasing member and is maintained in this state.

The proximal end boom 33 has a cylindrical shape and has an internal space capable of accommodating the intermediate boom 32. The proximal end boom 33 has the proximal end side B pin receiving part 332 at a proximal end part and the distal end side B pin receiving part 333 at a distal end part.

A pair of the proximal end side B pin receiving parts 332 is disposed coaxially with each other. A pair of the distal end side B pin receiving parts 333 is provided at a distal end part of the proximal end boom 33 and disposed coaxially with each other. Each of the proximal end side B pin receiving part 332 and the distal end side B pin receiving part 333 is configured to allow insertion and removal of the B pin 325 of the intermediate boom 32.

The B pins 315 and 325 are displaced in an axial direction thereof on the basis of the operation of a boom connection module 200 included in the pin insertion/removal actuator 50.

Specifically, the B pin 315 is inserted so as to be bridged over the proximal end side B pin receiving part 322 or the distal end side B pin receiving part 323 of the intermediate boom 32. As a result, the distal end boom 31 and the intermediate boom 32 are connected to each other and brought into a connection state. Meanwhile, when the B pin 315 is removed from the proximal end side B pin receiving part 322 or the distal end side B pin receiving part 323 of the intermediate boom 32, the connection between the distal end boom 31 and the intermediate boom 32 is released, and the distal end boom 31 and the intermediate boom 32 are brought into a disconnection state.

The B pin 325 is inserted so as to be bridged over the proximal end side B pin receiving part 332 or the distal end side B pin receiving part 333 of the proximal end boom 33. As a result, the intermediate boom 32 and the proximal end boom 33 are connected to each other and brought into a connection state. Meanwhile, when the B pin 325 is removed from the proximal end side B pin receiving part 332 or the distal end side B pin receiving part 333 of the proximal end boom 33, the connection between the intermediate boom 32 and the proximal end boom 33 is released, and the intermediate boom 32 and the proximal end boom 33 are brought into a disconnection state.

The distal end boom 31 is not movable in the telescoping direction with respect to the intermediate boom 32 in the connection state in which the distal end boom 31 is connected to the intermediate boom 32 with the B pin 315, and the distal end boom 31 is movable in the telescoping direction with respect to the intermediate boom 32 in the disconnection state. Similarly, the intermediate boom 32 is not movable in the telescoping direction with respect to the proximal end boom 33 in the connection state in which the intermediate boom 32 is connected to the proximal end boom 33 with the B pin 325, and the intermediate boom 32 is movable in the telescoping direction with respect to the proximal end boom 33 in the disconnection state.

The C pin 150 is displaced in an axial direction thereof on the basis of the operation of a cylinder connection module 100 included in the pin insertion/removal actuator 50.

Specifically, the distal end boom 31 and the intermediate boom 32 take either one of an engaged state in which the C pin 150 is engaged with the C pin receiving parts 311 and 321 and a disengaged state in which the C pin 150 is detached from the C pin receiving parts 311 and 321.

In the engaged state, the distal end boom 31 and the intermediate boom 32 are movable in the telescoping direction together with a movable portion of the telescoping actuator 40 (cylinder part 42 in the present embodiment). When the intermediate boom 32 moves, the distal end boom 31 connected to the intermediate boom 32 via the B pin 315 also moves together in the telescoping direction.

The extending operation of the telescopic boom 30 will be briefly described as follows.

Figure 3A:
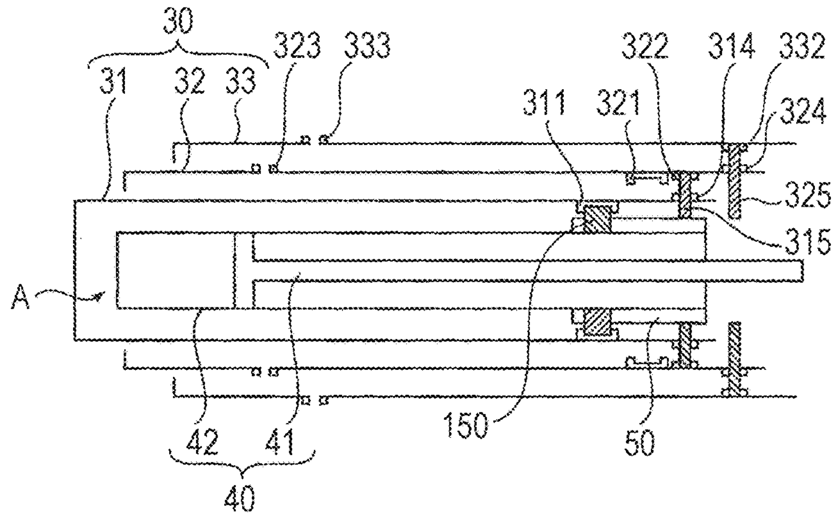
FIGS. 3A to 3C are schematic views for describing a structure and extending operation of a telescopic boom.

FIG. 3A illustrates a fully retracted state of the telescopic boom 30. In this state, the distal end boom 31 is accommodated in the intermediate boom 32, is connected to the intermediate boom 32 via the B pin 315, and is not movable in an extending direction (see FIG. 3C). In addition, the C pin 150 is engaged with the C pin receiving part 311 of the distal end boom 31, and the distal end boom 31 and the cylinder part 42 are in an engaged state.

Figure 3B:
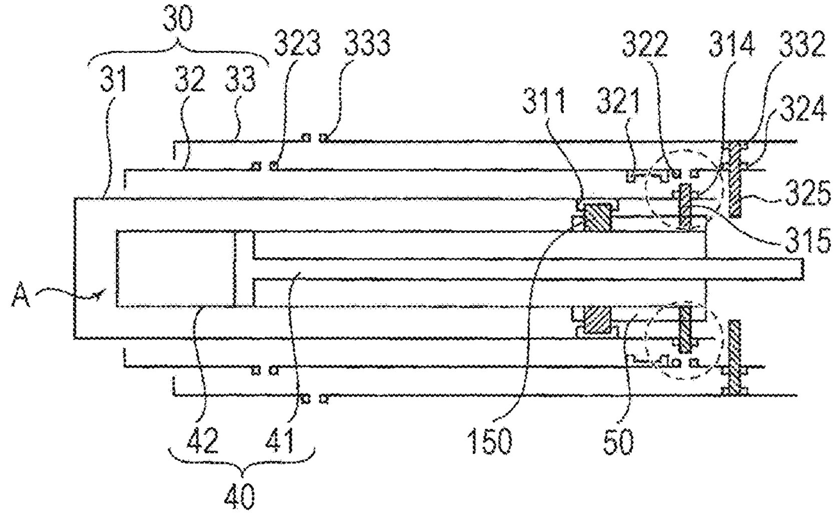

As illustrated in FIG. 3B, the B pin 315 is removed from the proximal end side B pin receiving part 322 of the intermediate boom 32 (see a part surrounded by a broken line in FIG. 3B), the distal end boom 31 and the intermediate boom 32 are brought into the disconnection state, and the distal end boom 31 is movable in the extending direction.

Figure 3C:
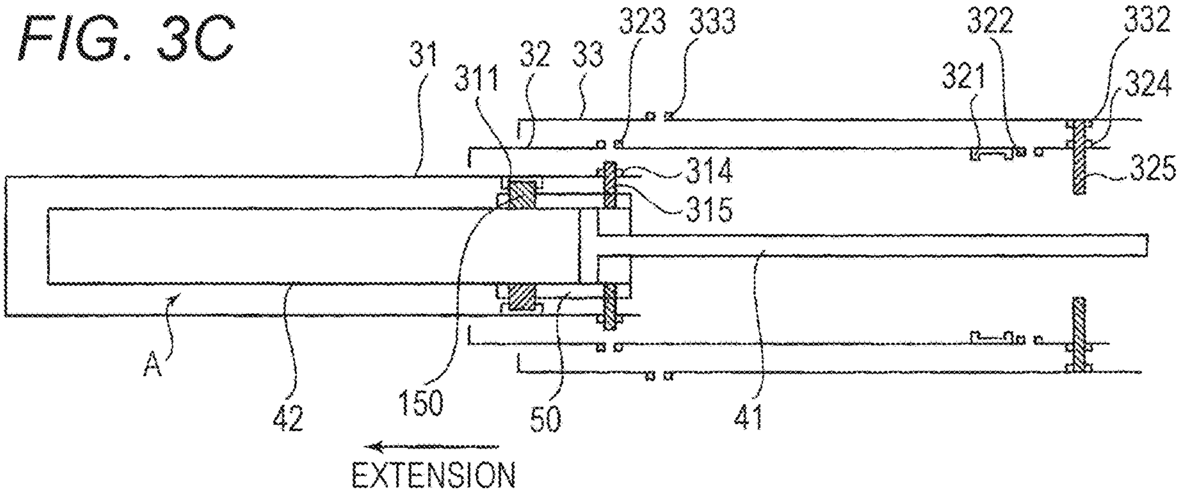

As illustrated in FIG. 3C, the distal end boom 31 moves to the distal end side as the telescoping actuator 40 operates to move the cylinder part 42 in the extending direction.

Figure 4A:
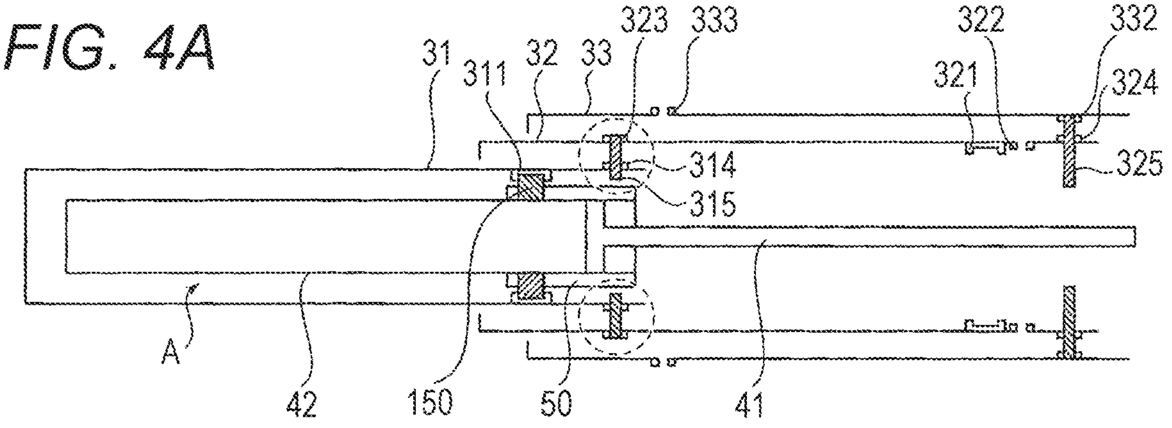
FIGS. 4A to 4C are schematic views for describing the structure and extending operation of the telescopic boom.

As illustrated in FIG. 4A, after the distal end boom 31 moves to a predetermined position, the B pin 315 is inserted into the distal end side B pin receiving part 323 of the intermediate boom 32 (see a part surrounded by a broken line in FIG. 4A), the distal end boom 31 and the intermediate boom 32 are brought into the connection state, and the distal end boom 31 is not movable in the extending direction.

Figure 4B:
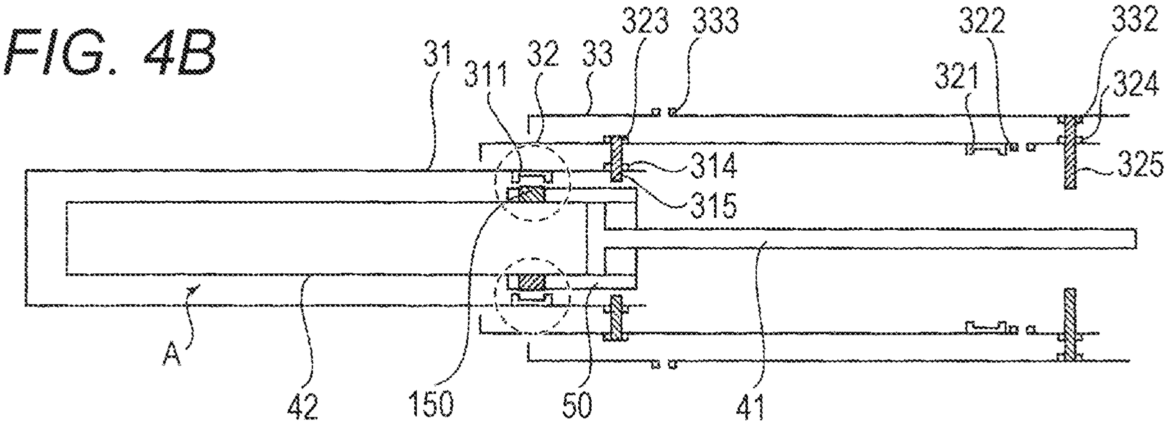

As illustrated in FIG. 4B, engagement between the C pin receiving part 311 of the distal end boom 31 and the C pin 150 is released (see a part surrounded by a broken line in FIG. 4B), and only the cylinder part 42 can be restored to a contracted state after being separated from the distal end boom 31.

Figure 4C:
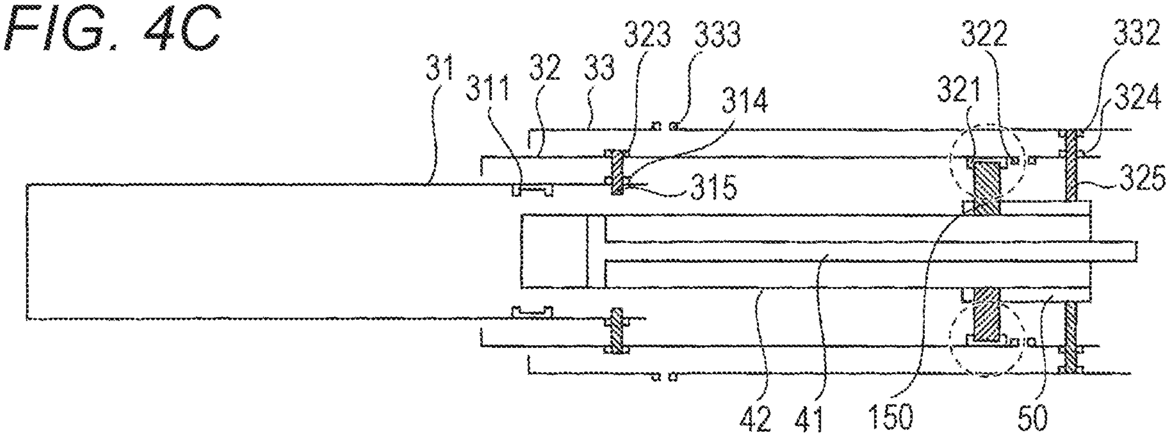

Then, as illustrated in FIG. 4C, the cylinder part 42 is restored to the contracted state, the C pin receiving part 321 of the intermediate boom 32 and the C pin 150 are engaged with each other, and the intermediate boom 32 and the cylinder part 42 are brought into an engaged state.

Note that in a case where the intermediate boom 32 is extended, operation similar to the operation described above is performed. In addition, in a case where the distal end boom 31 or the intermediate boom 32 is contracted, operation in a direction opposite to a direction described above is performed.

<Telescopic Device>

The extending operation and the contraction operation of the telescopic boom 30 described above are performed by the telescopic device A incorporated in the telescopic boom 30. The telescopic device A is disposed in the internal space of the distal end boom 31 in the fully retracted state (state illustrated in FIG. 3A) of the telescopic boom 30. A detailed configuration of the telescopic device A will be described below.

Figure 5:
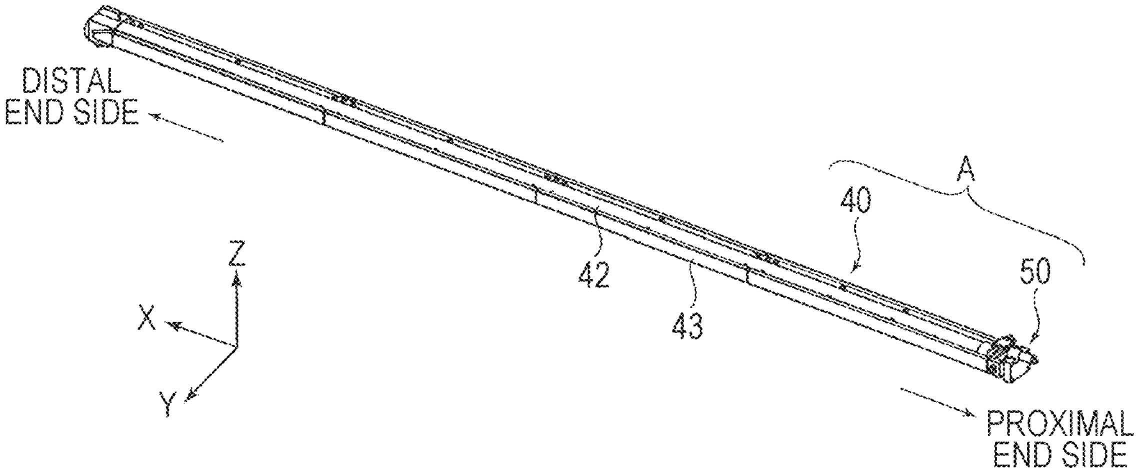
FIG. 5 is an overall perspective view of a telescopic device.

FIG. 5 is an external perspective view of the telescopic device A. Hereinafter, each component constituting the telescopic device A will be described using an orthogonal coordinate system (X, Y, Z) on the basis of a state in which each component is incorporated in the telescopic device A. Also in figures to be described later, each component is illustrated by the common orthogonal coordinate system (X, Y, Z). In the orthogonal coordinate system (X, Y, Z), an X direction coincides with the telescoping direction of the telescopic boom 30. A + side in the X direction is the distal end side of the telescopic boom 30, and a – side in the X direction is the proximal end side of the telescopic boom 30. For example, a Z direction coincides with an up-and-down direction of the mobile crane 1 in a fallen state in which a derricking angle of the telescopic boom 30 is 0°. A Y direction is orthogonal to the X direction and the Z direction and coincides with, for example, the width direction of the telescopic boom 30.

As illustrated in FIG. 5, the telescopic device A includes the telescoping actuator 40 and the pin insertion/removal actuator 50. The pin insertion/removal actuator 50 is disposed, for example, on the proximal end side of the telescoping actuator 40 so that the pin insertion/removal actuator 50 is movable together with the cylinder part 42.

The telescoping actuator 40 is a hydraulic cylinder having a piston rod part 41 (see FIG. 3A and the like) and the cylinder part 42. The telescoping actuator 40 moves the boom element (for example, the distal end boom 31 or the intermediate boom 32) connected to the cylinder part 42 via the C pin 150 (see FIG. 3A and the like) in the telescoping direction. The cylinder part 42 has, for example, a cylinder frame 43 with a rail. The rail (not illustrated) of the cylinder frame 43 is engaged with a rail groove provided in the telescopic boom 30. As a result, the cylinder part 42 can slide along the telescopic boom 30 in a stable posture in the telescoping direction. Note that since a main structure of the telescoping actuator 40 is substantially similar to a main structure of a publicly known hydraulic cylinder, detailed description thereof will be omitted.

Figure 6:
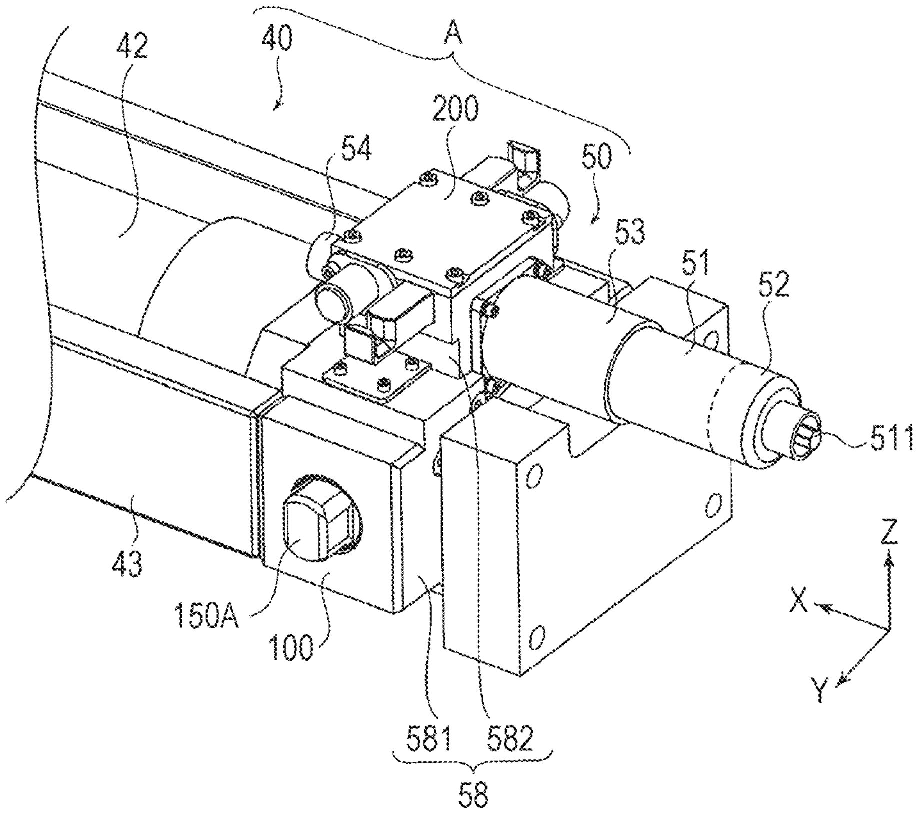
FIG. 6 is a perspective view of a pin insertion/removal actuator.
Figure 7:
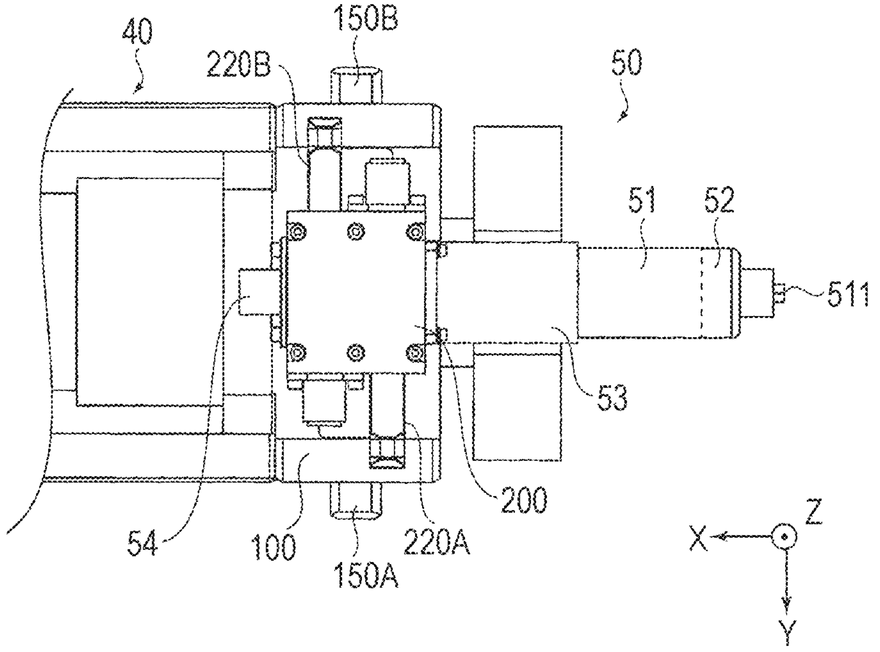
FIG. 7 is a plan view of the pin insertion/removal actuator as viewed from a + side in a Z direction.
Figure 8:
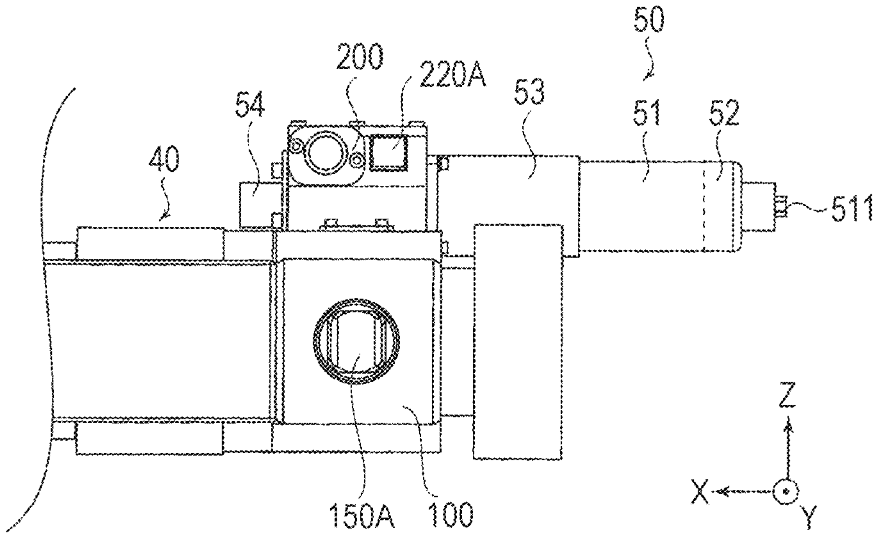
FIG. 8 is a side view of the pin insertion/removal actuator as viewed from a + side in a Y direction.
Figure 9:
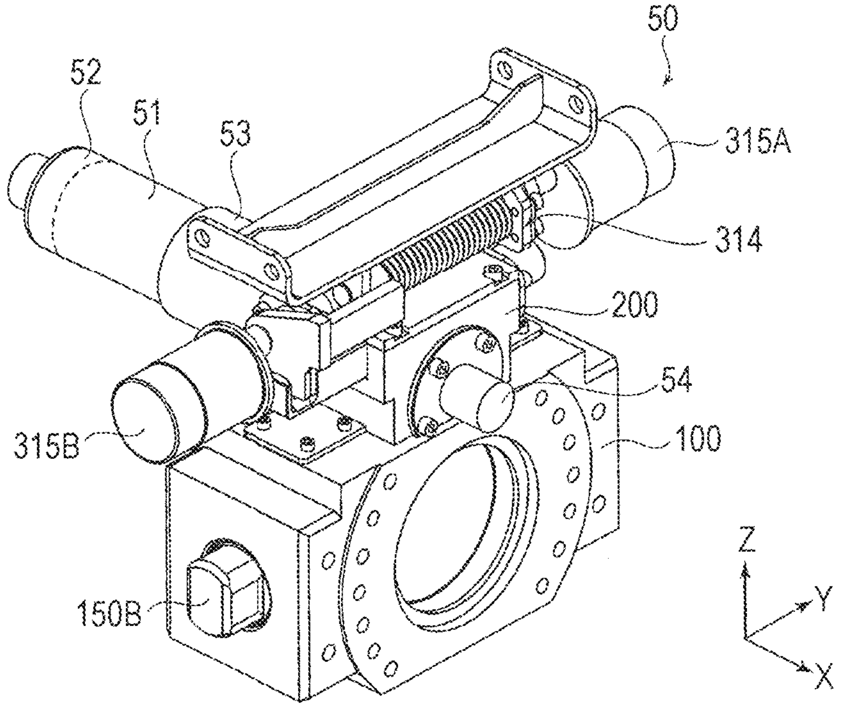
FIG. 9 is a perspective view illustrating a state in which the pin insertion/removal actuator and a B pin holding part are engaged with each other.
Figure 10:
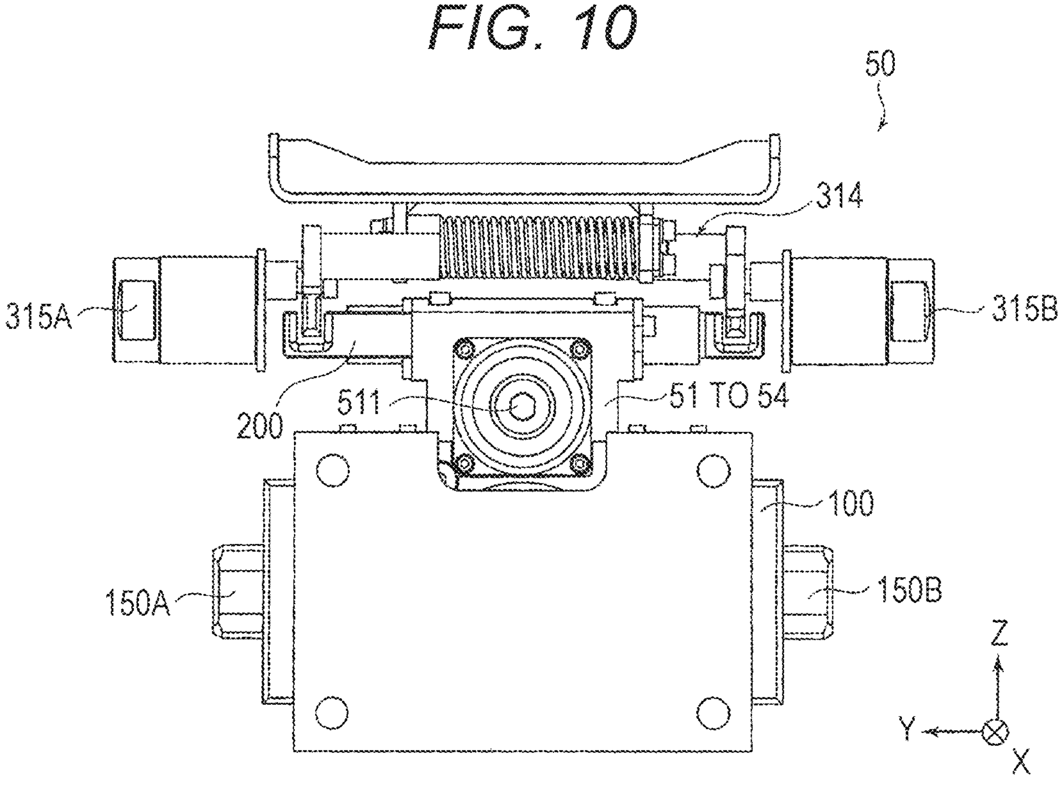
FIG. 10 is a front view of a state in which the pin insertion/removal actuator and the B pin holding part are engaged with each other when viewed from a-side in an X direction.

A configuration of the pin insertion/removal actuator 50 is illustrated in FIGS. 6 to 10. FIGS. 6 to 8 are a perspective view of the pin insertion/removal actuator 50, a plan view as viewed from a + side in the Z direction, and a side view as viewed from a + side in the Y direction, respectively. FIGS. 9 and 10 are a perspective view of a state in which the pin insertion/removal actuator 50 and the B pin holding part 314 are engaged with each other and a front view seen from the – side in the X direction, respectively.

In FIGS. 6 to 10, a pair of the C pins 150 is distinguished as “C pins 150A and 150B”. In addition, in FIGS. 9 and 10, the pair of B pins 315 is distinguished as “B pins 315A and 315B”.

As illustrated in FIGS. 6 to 8, the pin insertion/removal actuator 50 is disposed on the – side in the X direction (proximal end side) of the cylinder part 42 and is configured to move in the telescoping direction together with the cylinder part 42. The pin insertion/removal actuator 50 includes an electric motor 51 (electrical drive source), a brake 52, a transmission mechanism 53, a position detection device 54, a lock mechanism 55 (see FIG. 11 and the like), the cylinder connection module 100 (first connecting device), and the boom connection module 200 (second connecting device). The transmission mechanism 53 includes a clutch 61, a speed reducer 62, and a torque limiter 63 (see FIG. 14).

Each component is disposed in a housing 58 and unitized. As a result, it is possible to downsize the pin insertion/removal actuator 50, improve productivity, and increase the reliability of a system. Specifically, the housing 58 has a box-shaped first housing 581 and a box-shaped second housing 582.

The first housing 581 accommodates the cylinder connection module 100 in an internal space. Each of the C pins 150A and 150B of the cylinder connection module 100 is disposed so as to be movable forward and backward, for example, from both end parts of the first housing 581 in the Y direction. The piston rod part 41 (see FIG. 3A and the like) of the telescoping actuator 40 is inserted into the first housing 581 in the X direction. An end part of the cylinder part 42 is fixed to a side wall of the first housing 581 on the + side in the X direction.

The second housing 582 is provided on the + side in the Z direction of the first housing 581. The second housing 582 accommodates the boom connection module 200 in an internal space. A B pin rack bar 220A of the boom connection module 200 is disposed so as to be movable forward and backward, for example, from one end part of the second housing 582 in the Y direction, and a B pin rack bar 220B is disposed so as to be movable forward and backward, for example, from the other end part. In addition, a transmission shaft 56 (see FIG. 12) of the transmission mechanism 53 is inserted into the second housing 582 in the X direction.

The electric motor 51 is an electrical drive source that operates the cylinder connection module 100 and the boom connection module 200. The electric motor 51 includes, for example, a rotary motor that uses electromagnetic force to output rotational motion.

As the rotary motor, for example, various electromagnetic motors such as a brush motor (direct current (DC) motor), a brushless DC motor, and a stepping motor can be applied. The operation of the electric motor 51 is controlled by a control device 70 (see FIG. 14).

The electric motor 51 is supported by the second housing 582 via the transmission mechanism 53. An output shaft (not illustrated) of the electric motor 51 extends in the X direction. For example, the electric motor 51 is disposed so that a ring gear (not illustrated) disposed on the outer periphery of the piston rod part 41 as a mechanical element of the transmission mechanism 53 meshes with the output shaft of the electric motor 51. By disposing the electric motor 51 in this manner, it is possible to downsize the pin insertion/removal actuator 50 in the Y direction and the Z direction.

The electric motor 51 can be disposed in the cylinder frame 43 by applying a flat motor such as a large thin motor or a surface facing motor. In this case, a compact configuration is possible, and the cylinder frame 43 functions as a protective cover, so that the risk of damage due to interference during boom expansion/contraction operation can be reduced.

In addition, by taking advantage of a large outer diameter of the motor, power is directly transmitted from the output shaft of the electric motor 51 to the large-diameter ring gear, whereby a deceleration ratio can be reduced and inertia during insertion operation by a C pin biasing mechanism 160 or a B pin biasing mechanism 240 can be reduced.

The electric motor 51 is connected to, for example, a power supply device (not illustrated) disposed on the upper revolving body 10 (see FIG. 1) via a power supply cable. In addition, the electric motor 51 is connected to, for example, the control device 70 disposed on the upper revolving body 10 via a control signal transmission cable. These cables can be paid out and wound by a cord reel provided at a proximal end part of the telescopic boom 30 or the upper revolving body 10 (see FIG. 1).

Since the power supply cable and the control signal transmission cable requires a small wiring space and can be freely routed, the degree of freedom in design around the telescopic boom 30 is significantly improved as compared with a case where a pipe of a hydraulic actuator or a hydraulic circuit is provided.

In addition, the electric motor 51 has a manual operation part 511 that can be operated by a manual handle (not illustrated). The manual operation part 511 is for manually changing a state of the pin insertion/removal actuator 50 (specifically, the cylinder connection module 100 and the boom connection module 200). The manual operation part 511 is turned with the manual handle when the electric motor 51 fails or the like, whereby the output shaft of the electric motor 51 rotates to change a state of the pin insertion/removal actuator 50, and the B pins 315 and 325 and the C pin 150 can be inserted and removed.

In the present embodiment, the cylinder connection module 100 and the boom connection module 200 are operated by one electric motor 51. Note that as the electric motor 51, a motor for the cylinder connection module 100 and a motor for the boom connection module 200 may be separately provided. For example, in a case where the output shaft of the electric motor 51 is connected to a ring gear (not illustrated) of the transmission mechanism 53, since the disposition of the electric motor 51 is not particularly limited as long as the electric motor 51 is disposed on the outer periphery of the ring gear, a plurality of small motors can be easily disposed as the electric motor 51. In addition, since it is possible to obtain required torque by increasing or decreasing the number of the electric motors 51, the electric motor 51 can be composed of one type of motor, and can be easily applicable to the design of other models.

The brake 52 applies braking force to the electric motor 51. The brake 52 includes, for example, an electromagnetic brake that performs braking using electromagnetic force.

The operation of the brake 52 is controlled by the control device 70.

The brake 52 restricts the rotation of the output shaft of the electric motor 51 in a stopped state (non-energized state) of the electric motor 51. The brake 52 operates, for example, in a removed state of the cylinder connection module 100 or in a removed state of the boom connection module 200. As a result, the removed states of the cylinder connection module 100 and the boom connection module 200 are maintained in the stopped state of the electric motor 51. In addition, it is possible to achieve power saving and prevent the electric motor 51 from generating heat due to the electric motor 51 being brought into a locked state as compared with a case where the removed state is maintained by motor torque.

In addition, in a case where external force of a predetermined magnitude acts on the cylinder connection module 100 or the boom connection module 200 at the time of braking, the brake 52 may allow the rotation (that is, sliding)

of the electric motor 51. As a result, it is possible to prevent mechanical elements (for example, the electric motor 51, gears, and the like) of the pin insertion/removal actuator 50 from being damaged by overload.

The brake 52 is preferably disposed in a stage preceding the speed reducer 62 of the transmission mechanism 53. The stage preceding is an upstream side (− side in the X direction) in a power transmission path through which the power of the electric motor 51 is transmitted to the cylinder connection module 100 or the boom connection module 200, and the stage preceding includes an upstream side of the electric motor 51. Meanwhile, a stage following is a downstream side (+ side in the X direction) in the power transmission path of the electric motor 51. In the present embodiment, the brake 52 is disposed coaxially with the electric motor 51 on the − side in the X direction of the electric motor 51 (that is, a side opposite to the transmission mechanism 53 with the electric motor 51 as the center). By disposing the brake 52 in this manner, it is possible to downsize the pin insertion/removal actuator 50 in the Y direction and the Z direction. In addition, in a case where the brake 52 is disposed in the stage preceding the speed reducer 62, since brake torque required for maintaining the stopped state of the electric motor 51 is smaller than that in a case where the brake 52 is disposed in a stage following the speed reducer 62, it is possible to downsize the brake 52.

Note that various brake devices such as a mechanical brake device and an electromagnetic brake device can be applied to the brake 52. In addition, the position of the brake 52 is not limited to a position in the present embodiment.

The transmission mechanism 53 transmits the power (that is, rotational motion) of the electric motor 51 to the cylinder connection module 100 and the boom connection module 200.

The transmission mechanism 53 is disposed in the second housing 582. The transmission mechanism 53 has the clutch 61, the speed reducer 62, the torque limiter 63, and the like (see FIG. 14). The transmission mechanism 53 has, for example, the ring gear (not illustrated) disposed on the outer periphery of the piston rod part 41 and a transmission gear meshing with the ring gear, and the clutch 61, the speed reducer 62, and the torque limiter 63 are disposed on the transmission shaft 56 connected to the transmission gear.

The clutch 61 is disposed in the power transmission path for transmitting the power of the electric motor 51 and discretionally intermittently transmits the power to the cylinder connection module 100 and the boom connection module 200. The clutch 61 is disposed, for example, in the stage preceding the speed reducer 62 (between the electric motor 51 and the speed reducer 62 in the present embodiment) in the power transmission path. By disposing the clutch 61 in this manner, it is possible to reduce a transmission torque capacity of the clutch 61 and downsize the clutch 61.

For example, an electromagnetic clutch, a mechanical clutch, or a torque diode can be applied to the clutch 61. Since these configurations are publicly known, the configurations will be briefly described.

The electromagnetic clutch is a mechanical element that electromagnetically transmits or cuts off power transmission from an input shaft to an output shaft. In a case where the electromagnetic clutch is applied, the operation of the clutch 61 is controlled, for example, by the control device 70. Note that in a case where the operation of the clutch 61 is interlocked with the electric motor 51, it is not necessary to individually control the clutch 61.

The mechanical clutch is a mechanical element that transmits power by engagement between the input shaft and the output shaft. In a case where the mechanical clutch is applied, the clutch 61 is preferably a one-way clutch that transmits power from an input shaft to an output shaft while cutting off power from the output shaft to the input shaft and transmits power only in one direction.

The torque diode is a mechanical element that transmits power from an input shaft to an output shaft while cutting off power from the output shaft to the input shaft.

In a case where the mechanical clutch and the torque diode are applied, electrical control by the control device 70 or the like is unnecessary.

The speed reducer 62 decelerates the rotation of the electric motor 51 and outputs the decelerated rotation. The speed reducer 62 includes, for example, a planetary gear mechanism accommodated in a speed reducer case (reference sign is omitted), and an input shaft and an output shaft extend in the X direction. By disposing the speed reducer 62 in this manner, it is possible to downsize the pin insertion/removal actuator 50 in the Y direction and the Z direction.

Figure 21:
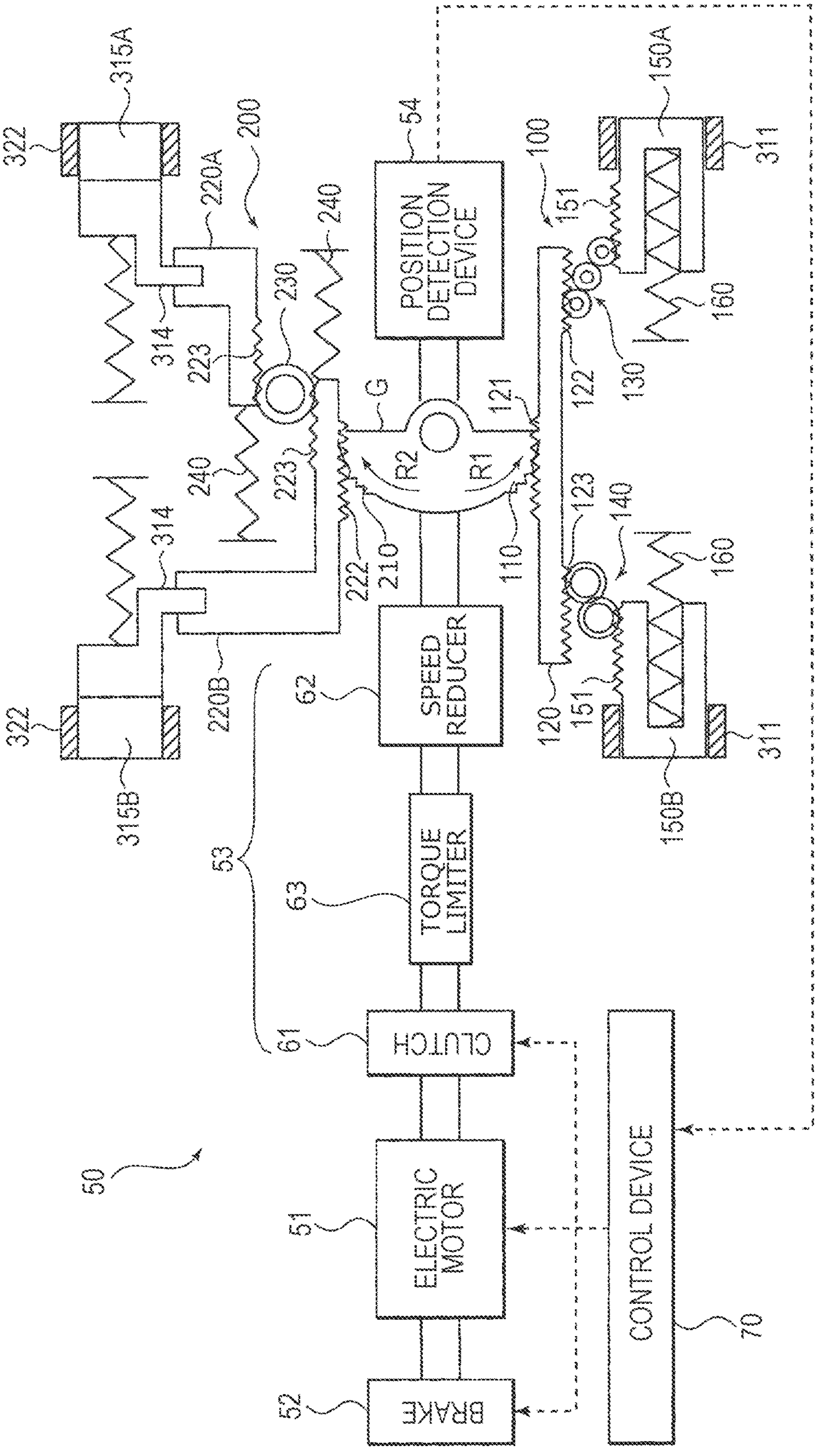
FIG. 21 is a view schematically illustrating a configuration of the pin insertion/removal actuator.

The torque limiter 63 is an overload protection device that is disposed in the power transmission path for transmitting the power of the electric motor 51 and maintains torque acting on mechanical elements (for example, the electric motor 51) constituting the power transmission path at a predetermined value or less. The torque limiter 63 is disposed, for example, in a stage following the speed reducer 62 in the power transmission path. By disposing the torque limiter 63 in this manner, it is possible to reduce influence of tolerances and variations of a torque setting value as compared with a case where the torque limiter 63 is disposed in the stage preceding the speed reducer 62. In addition, for example, the torque limiter 63 may be disposed in the stage preceding the speed reducer 62 in the power transmission path as illustrated in FIG. 21. In this case, since the torque setting value is decreased, it is possible to downsize the torque limiter 63.

Note that the torque limiter 63 continues to slide while the electric motor 51 is driven, whereby predetermined torque can continue to be given to the cylinder connection module 100 and the boom connection module 200. Therefore, the torque limiter 63 can be used as a substitute for the brake 52 to maintain the removed states of the cylinder connection module 100 and the boom connection module 200. In addition, since the electric motor 51 is not brought into the locked state, heat generation due to overload does not occur.

The torque limiter 63 includes, for example, a friction torque limiter that is attached to an output shaft of the clutch 61 (transmission shaft 56 of the transmission mechanism 53) and in which an input side element and an output side element are joined together while sliding when torque larger than a predetermined value is generated.

The position detection device 54 detects the displacement of the C pin 150 and the B pins 315 and 325 on the basis of the output (for example, the rotation of the output shaft) of the electric motor 51. The position detection device 54 detects, for example, a moving direction (rotation direction) and a moving amount (rotation angle) from a reference position of the C pin 150 or each of the B pins 315 and 325 (see FIGS. 17A and 18A).

The position detection device 54 includes, for example, an angle sensor such as a rotary encoder or a potentiometer and outputs information (for example, a pulse signal, a code signal) corresponding to a rotation amount of the output shaft of the electric motor 51. The rotary encoder detects and outputs the rotational displacement of the input shaft using a built-in lattice disk. The potentiometer converts a change in the rotation angle into a change in a resistance value and outputs the change in the resistance value.

An output method of the rotary encoder is not particularly limited and may be an incremental method of outputting a pulse signal (relative angle signal) according to a rotation amount (rotation angle) from a measurement start position, or an absolute method of outputting a code signal (absolute angle signal) corresponding to an absolute angle position with respect to a reference point.

In a case where the position detection device 54 includes an absolute type rotary encoder, absolute positions of the C pin 150 and the B pins 315 and 325 can be detected even when the non-energized state is restored to an energized state.

The position detection device 54 may be provided directly on the output shaft of the electric motor 51 or may be provided on a rotating member (for example, a rotation shaft, a gear, or the like) that rotates together with the output shaft of the electric motor 51.

In the present embodiment, the position detection device 54 is provided on the transmission shaft 56 in a stage following (on the + side in the X direction of) the transmission mechanism 53 (torque limiter 63) and outputs information corresponding to a rotation amount of the transmission shaft 56. In this case, a rotary encoder capable of obtaining sufficient resolution with respect to the number of rotations (rotation speed) of the transmission shaft 56 is suitable for the position detection device 54.

Note that since a C pin toothless gear 110 of the cylinder connection module 100 and a B pin toothless gear 210 of the boom connection module 200 are fixed to the transmission shaft 56, a detection result of the position detection device 54 can also be said to be information corresponding to rotation amounts of the C pin toothless gear 110 and the B pin toothless gear 210.

Note that the position detection device 54 is not limited to the above-described rotary encoder and may include, for example, a limit switch or a proximity sensor. The limit switch is disposed in the stage following the speed reducer 62 and mechanically operates on the basis of the output of the electric motor 51. In addition, the proximity sensor is disposed in the stage following the speed reducer 62 so that the proximity sensor faces the rotating member that rotates on the basis of the output of the electric motor 51, and the proximity sensor outputs a detection signal on the basis of a distance from the rotating member described above. The detection result of the position detection device 54 is output to the control device 70.

However, the proximity sensor and the limit switch are provided, for example, at positions where an inserted state and a removed state of each of the C pin 150 and the B pins 315 and 325 can be detected, and at least as many proximity sensors and limit switches as the C pin 150 and the B pin rack bars 220A and 220B are required. In contrast to this, in a case where the rotary encoder is applied, since a state of each of the C pin 150 and the B pins 315 and 325 can be detected by one detection sensor, it is possible to reduce the number of parts, and it is possible to reduce a cost.

In addition, the disposition of the position detection device 54 is not limited to the present embodiment. For example, the position detection device 54 may be disposed in the stage preceding the speed reducer 62. That is, the position detection device 54 may acquire information to be output to the control device 70 on the basis of the rotation of the electric motor 51 before being decelerated by the speed reducer 62. In a case where the position detection device 54 is disposed in the stage preceding the speed reducer 62, high resolution can be obtained as compared with a case where the position detection device is disposed in the stage following the speed reducer 62.

The control device 70 is, for example, an in-vehicle computer having a central processing unit (CPU) as an arithmetic/control device, a read only memory (ROM) and a random access memory (RAM) as main storage devices, an input terminal, an output terminal, and the like. The control device 70 calculates information on a position of the C pin 150 or positions of the B pins 315 and 325 on the basis of the output of the position detection device 54. In the calculation, data (tables, maps, and the like) indicating a correlation between the output of the position detection device 54 and the information on the positions of the C pin 150 and the B pins 315 and 325 (for example, the moving amount from the reference position) is used. This data is stored, for example, in the ROM.

For example, the control device 70 determines whether the C pin 150 is in the engaged state (for example, in a state illustrated in FIG. 3A) or in the disengaged state (for example, in a state illustrated in FIG. 4B) with respect to the C pin receiving part 311 of the distal end boom 31 or the C pin receiving part 321 of the intermediate boom 32, that is, a connection state between the pin insertion/removal actuator 50 and the distal end boom 31 or the intermediate boom 32, by calculation on the basis of the output of the position detection device 54.

In addition, in a case where an object to be telescoped is the distal end boom 31, the control device 70 determines whether the B pin 315 of the distal end boom 31 and the intermediate boom 32 are in the engaged state (see FIGS. 3A, 3C, and the like) or in the disengaged state (see FIG. 3B), that is, the connection state between the distal end boom 31 and the intermediate boom 32 by calculation on the basis of the detection result of the position detection device 54. Similarly, in a case where an object to be telescoped is the intermediate boom 32, the control device 70 determines the connection state between the intermediate boom 32 and the proximal end boom 33 by calculation on the basis of the detection result of the position detection device 54.

The control device 70 executes various types of control of the pin insertion/removal actuator 50, including, for example, operation control of the electric motor 51, the brake 52, the clutch 61, and the like on the basis of a calculation result. Note that, in executing the various types of control of the pin insertion/removal actuator 50, for example, various sensors provided in the telescopic boom 30 or the telescoping actuator 40 may be used to acquire information indicating a state of the telescopic boom 30 or the telescoping actuator 40.

Figure 11:
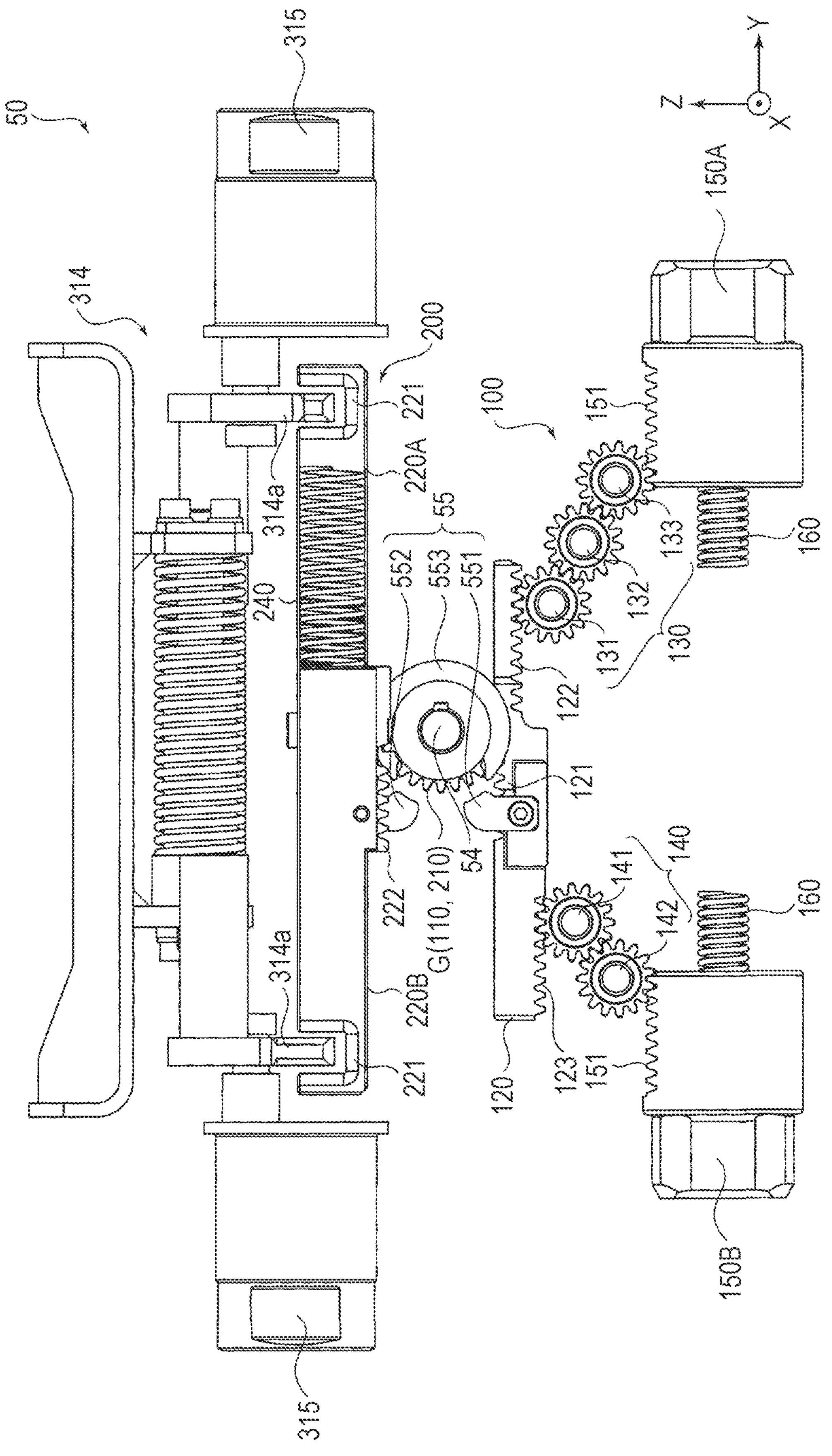
FIG. 11 is a view illustrating an internal structure of the pin insertion/removal actuator.
Figure 12:
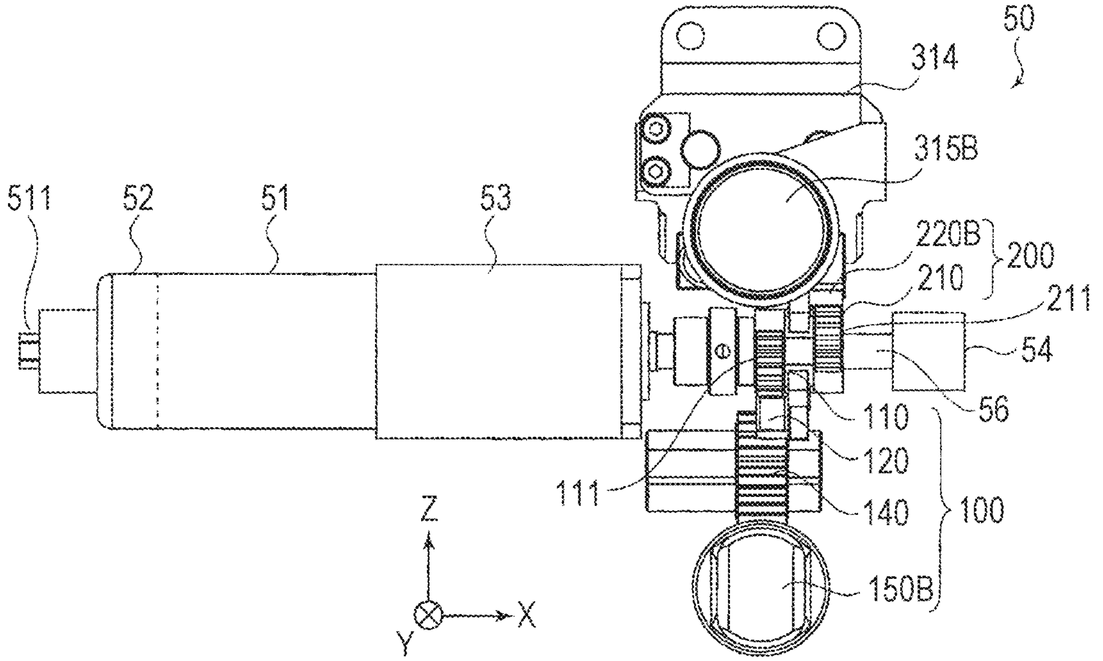
FIG. 12 is a view illustrating the internal structure of the pin insertion/removal actuator.
Figure 13:
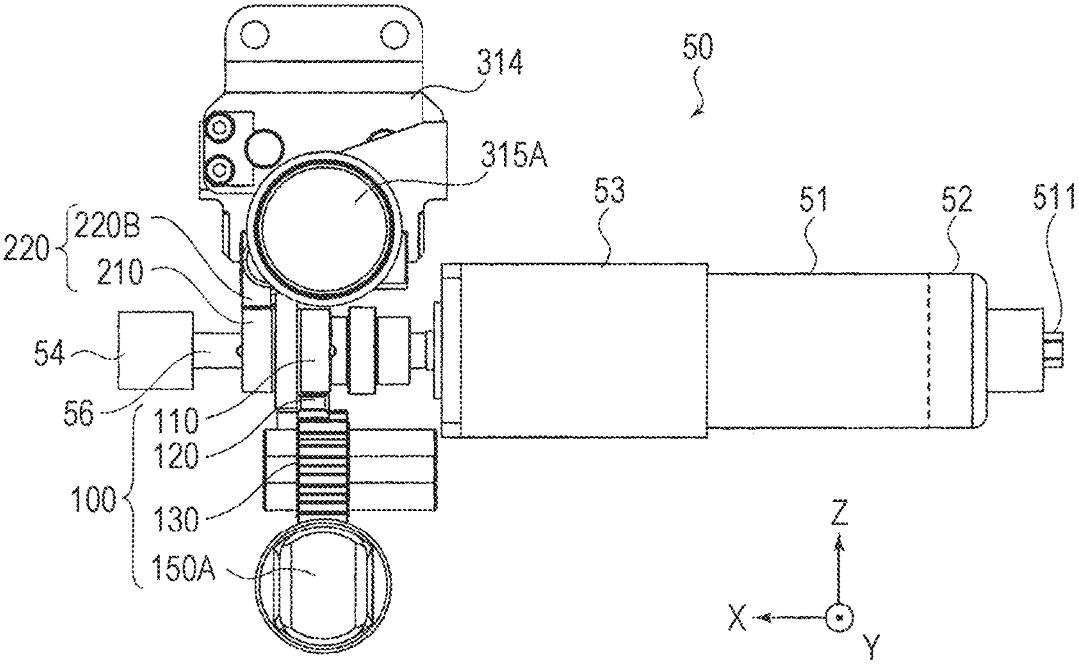
FIG. 13 is a view illustrating the internal structure of the pin insertion/removal actuator.
Figure 14:
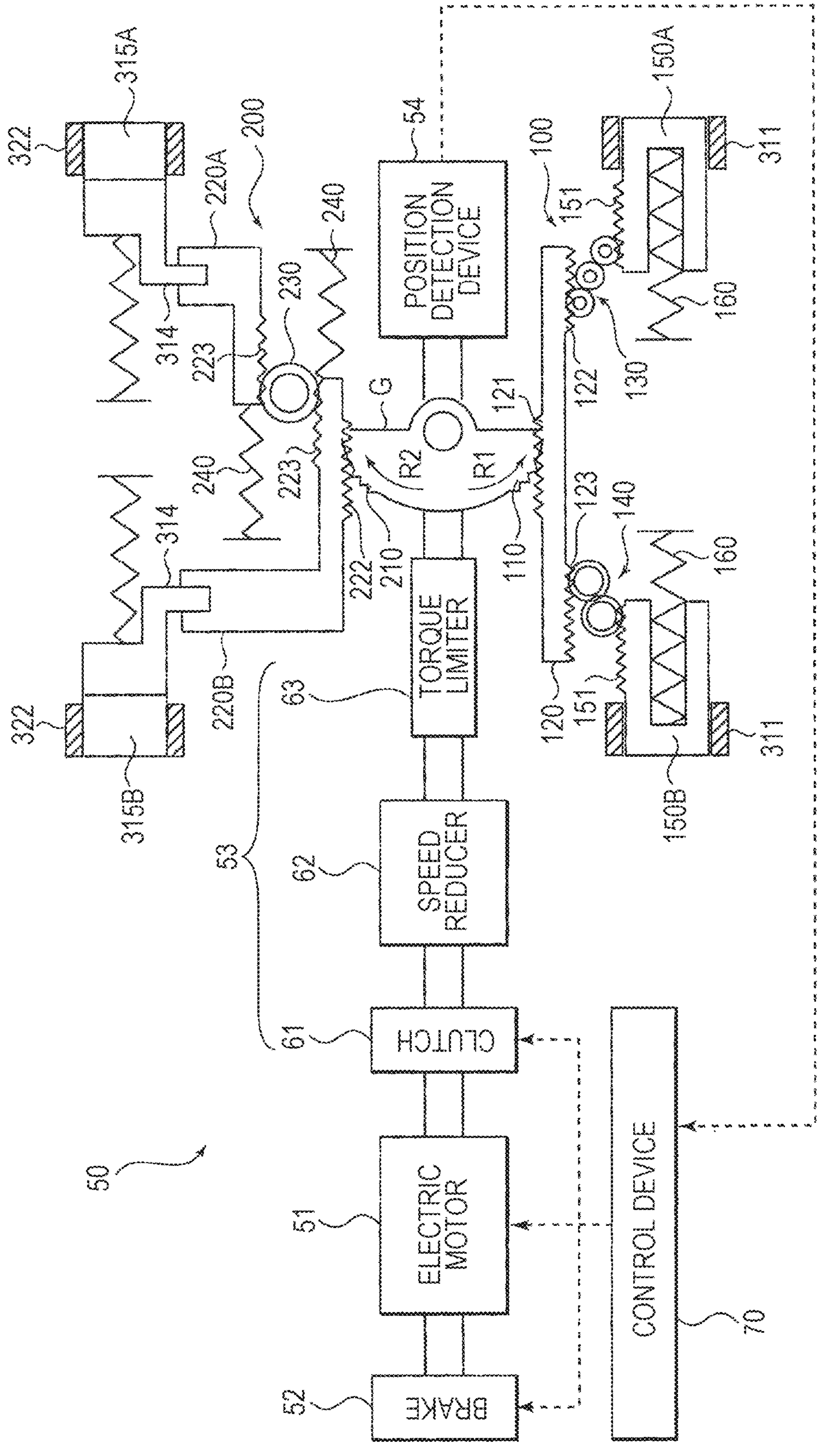
FIG. 14 is a view schematically illustrating a configuration of the pin insertion/removal actuator.

Referring to FIGS. 11 to 14, the cylinder connection module 100 and the boom connection module 200 will be described. FIGS. 11 to 13 are views illustrating an internal structure of the pin insertion/removal actuator 50. FIG. 14 is a view schematically illustrating the configuration of the pin insertion/removal actuator 50.

FIGS. 11 to 14 illustrate a neutral state in which the electric motor 51 is in the stopped state and the cylinder connection module 100 and the boom connection module 200 are not operating. In the neutral state, both the cylinder connection module 100 and the boom connection module 200 are in an inserted state. The neutral state is maintained, for example, by the movement of the C pin rack bar 120 and the B pin rack bars 220A and 220B being mechanically restricted by a stopper (not illustrated). Note that the neutral state may be maintained by the biasing force of the C pin biasing mechanism 160 and the biasing force of the B pin biasing mechanism 240 being balanced with each other.

Figure 15A:
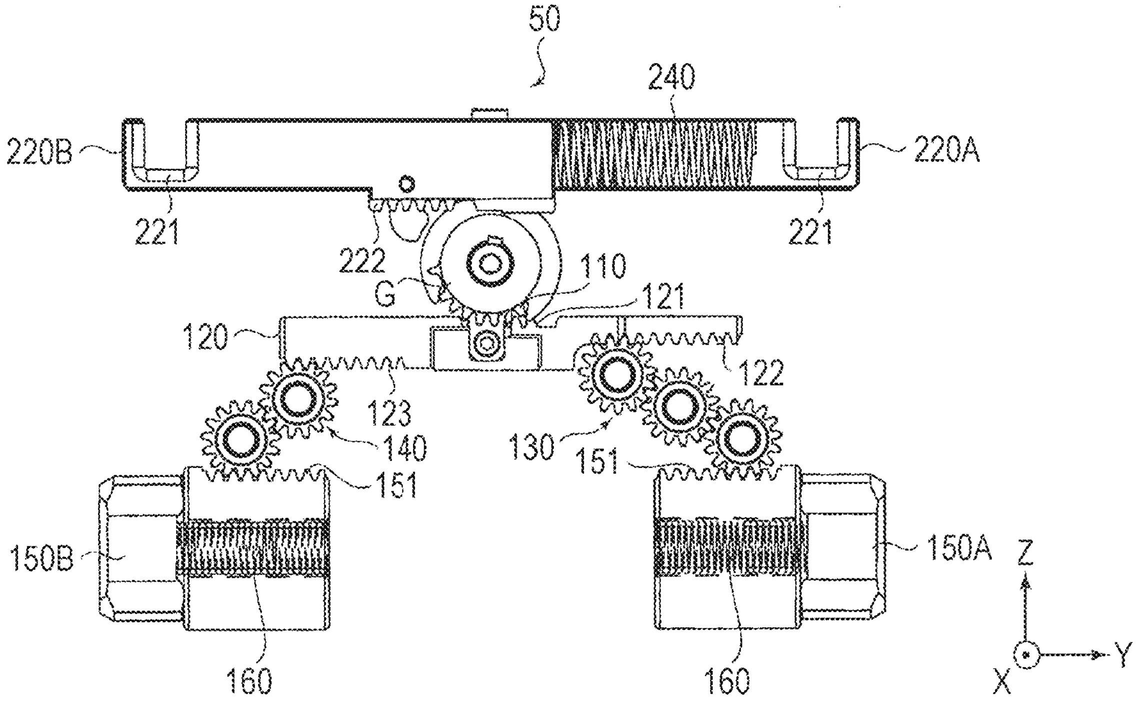
FIGS. 15A and 15B are views illustrating a removed state of a cylinder connection module and a removed state of a boom connection module.
Figure 15B:
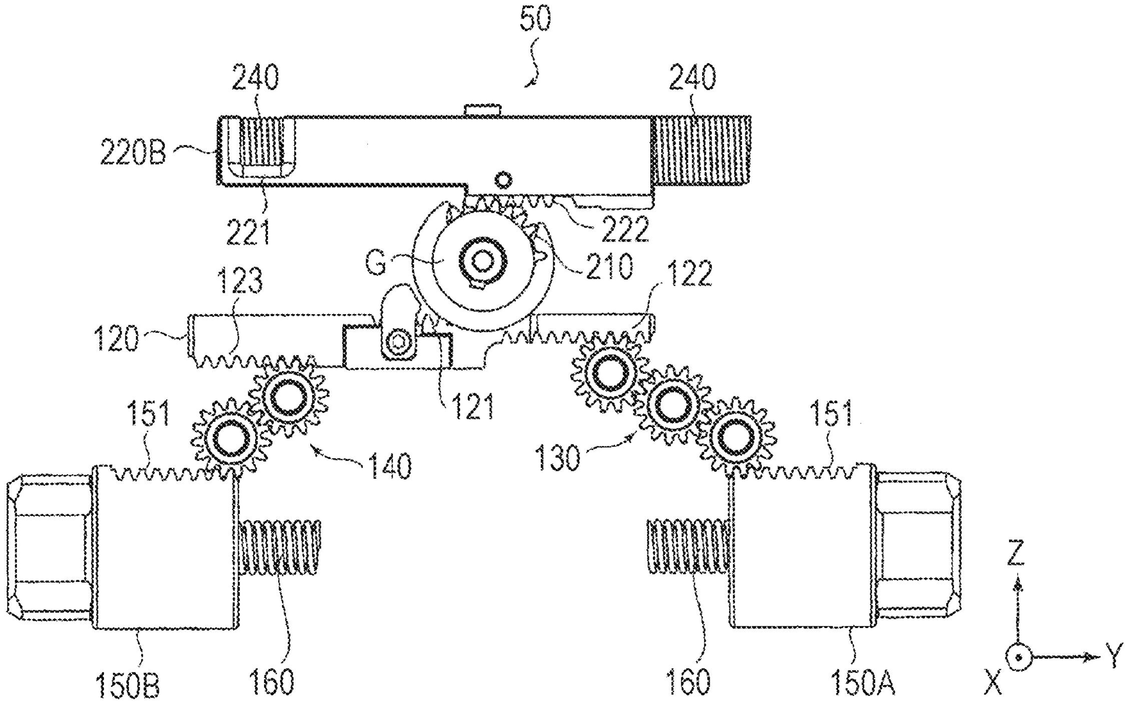

In addition, FIGS. 15A and 15B illustrate the removed state of the boom connection module 200 and the removed state of the cylinder connection module 100. As illustrated in FIG. 15A, in the removed state of the cylinder connection module 100, the boom connection module 200 is maintained in the inserted state. As illustrated in FIG. 15B, in the removed state of the boom connection module 200, the cylinder connection module 100 is maintained in the inserted state.

The cylinder connection module 100 operates on the basis of the power (that is, rotational motion) of the electric motor 51 and changes between the inserted state (see FIG. 11) and the removed state (see FIG. 15A).

The inserted state of the cylinder connection module 100 is a state in which the C pin receiving part 311 of the distal end boom 31 or the C pin receiving part 321 of the intermediate boom 32 are engaged with the C pin 150 to connect the respective boom elements and the pin insertion/removal actuator 50. In this connection state, the distal end boom 31 and the intermediate boom 32 are movable together with the cylinder part 42 and the pin insertion/removal actuator 50 (see FIG. 3B, FIG. 15B, and the like).

Meanwhile, the removed state of the cylinder connection module 100 is a state in which the C pin 150 is detached from the C pin receiving parts 311 and 321 of the distal end boom 31 or the intermediate boom 32, and the respective boom elements are separated from the pin insertion/removal actuator 50. In this disconnection state, the cylinder part 42 and the pin insertion/removal actuator 50 are movable independently from the respective boom elements (see FIG. 4B, FIG. 15A, and the like).

The boom connection module 200 operates on the basis of the power (that is, rotational motion) of the electric motor 51 and changes between the inserted state (see FIG. 11) and the removed state (see FIG. 15B).

The inserted state of the boom connection module 200 is, for example, a state in which the B pin 315 is inserted into the proximal end side B pin receiving part 322 or the distal end side B pin receiving part 323 of the intermediate boom 32 to connect the distal end boom 31 and the intermediate boom 32. In this connection state, the distal end boom 31 is not movable in the telescoping direction with respect to the intermediate boom 32 (see FIG. 3A, FIG. 15A, and the like).

Meanwhile, the removed state of the boom connection module 200 is, for example, a state in which the B pin 315 is detached from the proximal end side B pin receiving part 322 or the distal end side B pin receiving part 323 of the intermediate boom 32, and the distal end boom 31 is separate from the intermediate boom 32.

In this disconnection state, the distal end boom 31 is movable in the telescoping direction with respect to the intermediate boom 32 (see FIG. 3B, FIG. 15B, and the like).

As illustrated in FIGS. 11 to 14, the cylinder connection module 100 has the C pin toothless gear 110, the C pin rack bar 120, a first gear group 130, a second gear group 140, the C pin 150, and the C pin biasing mechanism 160. Each of the mechanical elements 110 to 160 is an example of constituent members of the first connection mechanism. In the following description, the C pin 150 is distinguished as the "C pins 150A and 150B".

Note that in the present embodiment, a pair of the C pins 150A and 150B is incorporated in the cylinder connection module 100, but the C pins 150A and 150B may be provided independently from the cylinder connection module 100.

The C pin toothless gear 110 is a substantially discoid gear and has a tooth part 111 (see FIG. 12) on a part of the outer peripheral surface. The C pin toothless gear 110 is externally fitted and fixed to the transmission shaft 56 of the transmission mechanism 53 and rotates together with the transmission shaft 56. The C pin toothless gear 110 constitutes a switch gear G (see FIG. 14) together with the B pin toothless gear 210 of the boom connection module 200. The power of the electric motor 51 is alternatively transmitted to either one of the cylinder connection module 100 and the boom connection module 200 by the switch gear G.

In the present embodiment, the C pin toothless gear 110 and the B pin toothless gear 210 constituting the switch gear G are incorporated in the cylinder connection module 100 that is the first connection mechanism and the boom connection module 200 that is the second connection mechanism, respectively. However, the switch gear G may be provided independently from the first connection mechanism and the second connection mechanism.

In addition, the switch gear G only needs to function as the C pin toothless gear 110 and the B pin toothless gear 210 and for example, may include one toothless gear, as illustrated in FIG. 14.

In the following description, a rotation direction (R1 direction in FIG. 14) of the C pin toothless gear 110 when the cylinder connection module 100 changes from the inserted state (see FIG. 11) to the removed state (see FIG. 15A) is referred to as the "forward direction", and a rotation direction (R2 direction in FIG. 14) of the C pin toothless gear 110 when the cylinder connection module 100 changes from the removed state to the inserted state is referred to as the "reverse direction".

Among projections constituting the tooth part 111 of the C pin toothless gear 110, a projection provided at an end part in the forward direction of the C pin toothless gear 110 is a positioning tooth (not illustrated).

The C pin rack bar 120 is, for example, a shaft member extending in one direction and is disposed along the Y direction on a lower side (− side in the Z direction) of the C pin toothless gear 110.

The C pin rack bar 120 has an input side rack part 121 on a surface closer to the C pin toothless gear 110 (+ side in the Z direction) and has two output side rack parts 122 and 123 on a surface farther from the C pin toothless gear 110 (− side in the Z direction).

The input side rack part 121 meshes with the tooth part 111 of the C pin toothless gear 110 only when the cylinder connection module 100 changes from the inserted state (see FIG. 11) to the removed state (see FIG. 15A).

Specifically, in the inserted state of the cylinder connection module 100, a first end face (not illustrated) of the input side rack part 121 on the + side in the Y direction abuts on the positioning tooth (not illustrated) in the tooth part 111 of the C pin toothless gear 110 or faces the positioning teeth (not illustrated) in the Y direction via a slight gap. In this state, when the C pin toothless gear 110 rotates in the R1 direction, the positioning tooth pushes the first end face to the + side in the Y direction, and the C pin rack bar 120 moves to the + side in the Y direction. Then, the tooth part 111 formed in the reverse direction from the positioning tooth sequentially mesh with the input side rack part 121. As a result, the C pin rack bar 120 moves to the + side in the Y direction along with the rotation of the C pin toothless gear 110 in the R1 direction.

Note that in a case where the C pin toothless gear 110 rotates in the R2 direction in the inserted state of the cylinder connection module 100 illustrated in FIG. 11, the input side rack part 121 does not mesh with the tooth part 111 of the C pin toothless gear 110.

As described above, the C pin rack bar 120 moves in a longitudinal direction (Y direction) thereof with the rotation of the C pin toothless gear 110. The C pin rack bar 120 is positioned on the most − side in the Y direction in the inserted state of the cylinder connection module 100 (see FIG. 11) and is positioned on the most + side in the Y direction in the removed state (see FIG. 15A).

That is, when the C pin toothless gear 110 rotates in the R1 direction in the inserted state (neutral state) of the cylinder connection module 100, the C pin rack bar 120 moves to the + side in the Y direction and changes to the removed state. Meanwhile, when the C pin toothless gear 110 rotates in the R2 direction in the removed state of the cylinder connection module 100, the C pin rack bar 120 moves to the − side in the Y direction and changes to an inserted state.

The output side rack parts 122 and 123 mesh with the first gear group 130 and the second gear group 140, respectively.

The first gear group 130 has, for example, a drive gear 131, an intermediate gear 132, and a driven gear 133. Each gear element includes a spur gear.

Specifically, the drive gear 131 meshes with the output side rack part 122 of the C pin rack bar 120 and the intermediate gear 132. The intermediate gear 132 meshes with the drive gear 131 and the driven gear 133. The driven gear 133 meshes with the intermediate gear 132 and a pin side rack part 151 of one C pin 150A.

When the cylinder connection module 100 is in the inserted state, the drive gear 131 meshes with an end part on the + side in the Y direction or a part close to the end part in the output side rack part 122 of the C pin rack bar 120. In addition, the driven gear 133 meshes with the end part on the − side in the Y direction of the pin side rack part 151 of the one C pin 150A.

The second gear group 140 has, for example, a drive gear 141 and a driven gear 142. Each gear element includes a spur gear.

Specifically, the drive gear 141 meshes with an output side rack part 123 of the C pin rack bar 120 and the driven gear 142. The driven gear 142 meshes with the drive gear 141 and the pin side rack part 151 of the other C pin 150B.

When the cylinder connection module 100 is in the inserted state, the drive gear 141 meshes with an end part on the + side in the Y direction or a part close to the end part in the output side rack part 123 of the C pin rack bar 120. In addition, the driven gear 142 meshes with the end on the + side in the Y direction in the pin side rack part 151 of the other C pin 150B.

In the first gear group 130, the drive gear 131 and the driven gear 133 are connected via the intermediate gear 132, whereas in the second gear group 140, the drive gear 141 and the driven gear 142 are directly connected. Therefore, a rotation direction of the driven gear 133 of the first gear group 130 and a rotation direction of the driven gear 142 of the second gear group 140 are opposite to each other.

The pair of C pins 150A and 150B is disposed, for example, coaxially with each other in the Y direction. The C pins 150A and 150B are preferably symmetric with respect to the center of the piston rod part 41 of the telescoping actuator 40. As a result, it is possible to prevent bending stress from being generated in the piston rod part 41 and to reduce a dimension in a height direction (Z direction).

Note that the C pins 150A and 150B only need to be disposed symmetrically with respect to the telescoping direction (X direction), and for example, may be disposed at positions shifted from each other in the Z direction or may be provided at positions eccentric to the piston rod part 41 (for example, the − side in the Z direction of the piston rod part 41).

Hereinafter, distal end parts of the C pins 150A and 150B are end parts on sides far from each other, and proximal end parts thereof are end parts on sides close to each other.

The C pins 150A and 150B each have a pin side rack part 151 on the outer peripheral surface.

The pin side rack part 151 of the one C pin 150A meshes with the driven gear 133 of the first gear group 130. The pin side rack part 151 of the other C pin 150B meshes with the driven gear 142 of the second gear group 140.

The C pins 150A and 150B move in an axial direction thereof (Y direction) with the rotation of the driven gears 133 and 142, respectively. Specifically, the one C pin 150A moves to the − side in the Y direction when the cylinder connection module 100 changes from the inserted state to the removed state, and the one C pin 150A moves to the + side in the Y direction when the cylinder connection module 100 changes from the removed state to the inserted state. The other C pin 150B moves to the + side in the Y direction when the cylinder connection module 100 changes from the inserted state to the removed state, and the other C pin 150B moves to the − side in the Y direction when the cylinder connection module 100 changes from the removed state to the inserted state. That is, in the above-described state change, the C pins 150A and 150B move in directions opposite to each other in the Y direction.

The C pin biasing mechanism 160 biases the C pins 150A and 150B in directions away from each other. The C pin biasing mechanism 160 includes, for example, a pair of compression coil springs. In the present embodiment, the C pin biasing mechanism 160 is disposed on each of the proximal end sides of the C pins 150A and 150B and biases the C pins 150A and 150B toward the distal end side.

When the electric motor 51 rotates in the R1 direction to bring the cylinder connection module 100 into the removed state (see FIG. 15A) and then the operation of the electric motor 51 stops, the cylinder connection module 100 is automatically restored to the inserted state by the biasing force of the C pin biasing mechanism 160. However, in a case where the brake 52 is operating, the cylinder connection module 100 is not automatically restored to the inserted state, and the removed state is maintained.

Note that the C pin biasing mechanism 160 may directly apply biasing force to the C pins 150A and 150B or may apply biasing force via another member. In addition, the C pin biasing mechanism 160 may be omitted, and the cylinder connection module 100 may be configured to change from the removed state to the inserted state on the basis of the power of the electric motor 51. Even in this case, from the viewpoint of fail-safe, it is preferable to provide the C pin biasing mechanism 160 and configure so that the cylinder connection module 100 is restored to the inserted state that is a safe side when the electric motor 51 fails.

As illustrated in FIGS. 11 to 13, the boom connection module 200 has the B pin toothless gear 210, a pair of the B pin rack bars 220A and 220B, a synchronous gear 230 (see FIG. 14), and the B pin biasing mechanism 240. Each of the mechanical elements 210 to 240 is an example of constituent members of the second connection mechanism. In the following description, the B pin 315 is distinguished as the "B pins 315A and 315B".

In addition, a case where the boom connection module 200 acts on the B pin 315 will be described, but the same applies to a case where the boom connection module 200 acts on the B pin 325.

The B pin toothless gear 210 is a substantially discoid gear and has a tooth part 211 on a part of the outer peripheral surface. The B pin toothless gear 210 is externally fitted and fixed to the transmission shaft 56 on the + side in the X direction of the C pin toothless gear 110 and rotates together with the transmission shaft 56. As described above, the B pin toothless gear 210 constitutes the switch gear G (see FIG. 14) together with the C pin toothless gear 110 of the cylinder connection module 100.

In the following description, a rotation direction (R2 direction in FIG. 14) of the B pin toothless gear 210 when the boom connection module 200 changes from the inserted state (see FIG. 11) to the removed state (see FIG. 15B) is referred to as the "forward direction", and a rotation direction (R1 direction in FIG. 14) of the B pin toothless gear 210 when the boom connection module 200 changes from the removed state to the inserted state is referred to as the "reverse direction".

Among projections constituting the tooth part 211 of the B pin toothless gear 210, a projection provided at an end part in the forward direction of the B pin toothless gear 210 is a positioning tooth (reference sign is omitted).

That is, the rotation direction R2 of the B pin toothless gear 210 when the boom connection module 200 changes from the inserted state to the removed state is opposite to the rotation direction R1 of the C pin toothless gear 110 when the cylinder connection module 100 changes from the inserted state to the removed state.

The pair of B pin rack bars 220A and 220B is, for example, shaft members extending in one direction and is disposed parallel to each other along the Y direction on an upper side (+ side in the Z direction) of the B pin toothless gear 210. In addition, the B pin rack bars 220A and 220B are disposed around the synchronous gear 230 (see FIG. 14) in the X direction.

Each of the B pin rack bars 220A and 220B has an engaging part 221 that engages with a locking piece 314*a* of the B pin holding part 314. The locking piece 314*a* is provided, for example, at both end parts in the Y direction (in the vicinity of the B pins 315A and 315B) in the B pin holding part 314.

One B pin rack bar 220B has a drive side rack part 222 on a surface close to the B pin toothless gear 210. In addition, the B pin rack bars 220A and 220B have synchronization side rack parts 223 (see FIG. 14) on surfaces facing each other in the X direction. Each of the synchronization side rack parts 223 meshes with the synchronous gear 230.

The drive side rack part 222 meshes with the tooth part 211 of the B pin toothless gear 210 only when the boom connection module 200 changes from the inserted state (see FIG. 11) to the removed state (see FIG. 15B).

Specifically, in the inserted state of the boom connection module 200, a first end face (not illustrated) of the drive side rack part 222 on the + side in the Y direction abuts on the positioning tooth (not illustrated) in the tooth part 211 of the B pin toothless gear 210 or faces the positioning teeth (not illustrated) in the Y direction via a slight gap. In this state, when the B pin toothless gear 210 rotates in the R2 direction, the positioning tooth pushes the first end face to the + side in the Y direction, and the one B pin rack bar 220B moves to the + side in the Y direction.

In addition, when the one B pin rack bar 220B moves to the + side in the Y direction, the synchronous gear 230 rotates, and the other B pin rack bar 220A moves to the − side in the Y direction (that is, a side opposite to the B pin rack bar 220B).

Note that in a case where the B pin toothless gear 210 rotates in the R1 direction in the inserted state of the boom connection module 200 illustrated in FIG. 11, the drive side rack part 222 does not mesh with the tooth part 211 of the B pin toothless gear 210.

As described above, each of the B pin rack bars 220A and 220B moves in a longitudinal direction (Y direction) thereof with the rotation of the B pin toothless gear 210.

The one B pin rack bar 220B is positioned on the most − side in the Y direction in the inserted state of the boom connection module 200 (see FIG. 11) and is positioned on the most + side in the Y direction in the removed state (see FIG. 15B). In addition, the other B pin rack bar 220A is positioned on the most + side in the Y direction in the inserted state of the boom connection module 200 (see FIG. 11) and is positioned on the most − side in the Y direction in the removed state (see FIG. 15B).

As the one B pin rack bar 220B moves in the Y direction, one locking piece 314*a* of the B pin holding part 314 and the engaging part 221 of the B pin rack bar 220B abut on each other. Then, a member of the B pin holding part 314 that supports the B pin 315B moves in the Y direction, whereby the B pin 315B changes to an inserted state or a removed state.

Similarly, as the other B pin rack bar 220A moves in the Y direction, the other locking piece 314*a* of the B pin holding part 314 and the engaging part 221 of the B pin rack bar 220A abut on each other. Then, a member of the B pin holding part 314 that supports the B pin 315A moves in the Y direction, whereby the B pin 315A changes to an inserted state or a removed state.

In the above-described state change, the B pins 315A and 315B move in directions opposite to each other in the Y direction.

Note that the movement of the one B pin rack bar 220B toward the + side in the Y direction and the movement of the other B pin rack bar 220A toward the − side in the Y direction are restricted, for example, by abutment on a stopper (not illustrated) provided in the housing 58.

The B pin biasing mechanism 240 biases the B pin rack bars 220A and 220B in directions away from each other. The B pin biasing mechanism 240 includes, for example, a pair of compression coil springs. In the present embodiment, the B pin biasing mechanism 240 is incorporated in the B pin rack bars 220A and 220B and biases the B pin rack bars 220A and 220B toward the distal end side.

When the electric motor 51 rotates in the R2 direction to bring the boom connection module 200 into the removed state (see FIG. 15B) and then the operation of the electric motor 51 stops, the boom connection module 200 is automatically restored to the inserted state (see FIG. 11) by the biasing force of the B pin biasing mechanism 240. However, in a case where the brake 52 is operating, the boom connection module 200 is not automatically restored to the inserted state, and the removed state is maintained.

Note that the B pin biasing mechanism 240 may directly apply biasing force to the B pin rack bars 220A and 220B or may apply biasing force via another member. In addition, the B pin biasing mechanism 240 may be omitted, and the boom connection module 200 may be configured to change from the removed state to the inserted state on the basis of the power of the electric motor 51. Even in this case, from the viewpoint of fail-safe, it is preferable to provide the B pin biasing mechanism 240 and configure so that the boom connection module 200 is restored to the inserted state that is a safe side when the electric motor 51 fails.

The lock mechanism 55 prevents external force other than power from the electric motor 51 from acting on the cylinder connection module 100 (for example, the C pin rack bar 120) or the boom connection module 200 (for example, the B pin rack bars 220A and 220B) to cause the cylinder connection module 100 and the boom connection module 200 to change to the removed state simultaneously. That is, in a state in which one connection mechanism of the boom connection module 200 and the cylinder connection module 100 is operating, the lock mechanism 55 blocks the operation of the other connection mechanism.

Figure 16A:
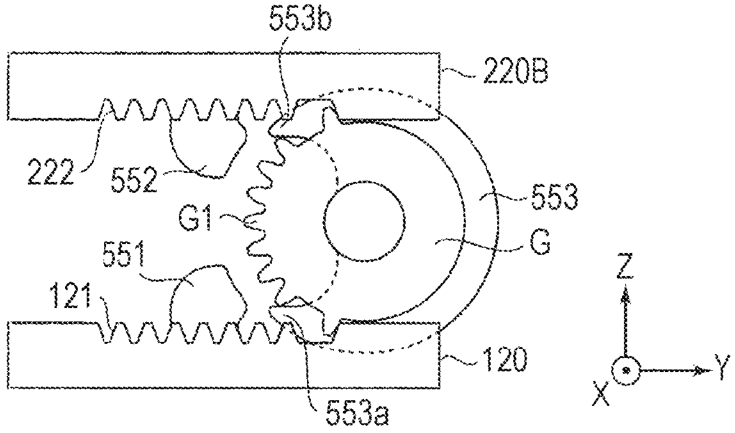
FIGS. 16A to 16C are schematic views for describing the operation and action of a lock mechanism.
Figure 16B:
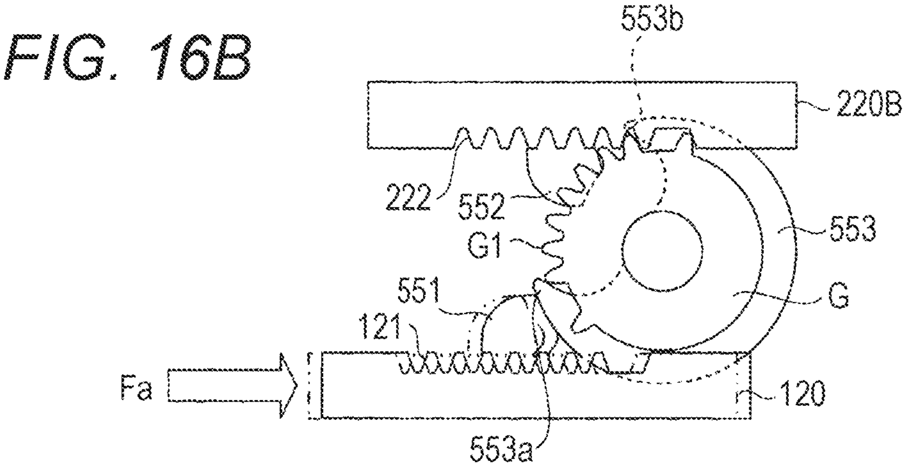
Figure 16C:
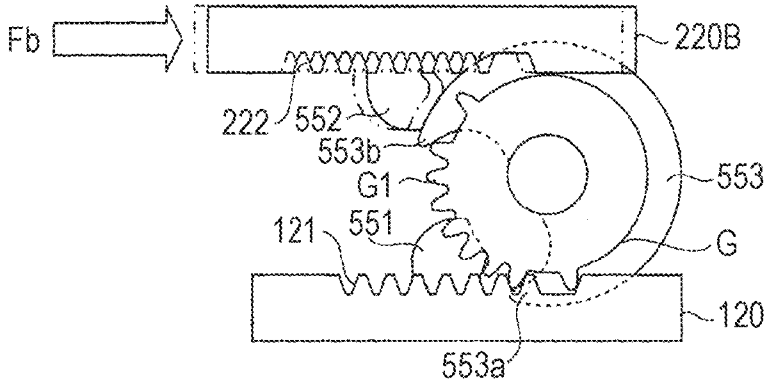

Referring to FIGS. 16A to 16C, the lock mechanism 55 will be described. FIG. 16A illustrates a state in which the cylinder connection module 100 and the boom connection module 200 are in the inserted state (neutral position), and FIGS. 16B and 16C each illustrate a state when the boom connection module 200 changes from the inserted state to the removed state. Note that in FIGS. 16A to 16C, the C pin toothless gear 110 of the cylinder connection module 100 and the B pin toothless gear 210 of the boom connection module 200 are illustrated as an integrally formed switch gear G.

As illustrated in FIG. 16A and the like, the lock mechanism 55 has a first projection 551, a second projection 552, and a cam member 553 (lock side rotating member).

The first projection 551 is provided integrally with the C pin rack bar 120 of the cylinder connection module 100. Specifically, the first projection 551 is provided at a position adjacent to the input side rack part 121 of the C pin rack bar 120.

The second projection 552 is provided integrally with the one B pin rack bar 220B of the boom connection module 200. Specifically, the second projection 552 is provided at a position adjacent to the drive side rack part 222 of the one B pin rack bar 220B.

The cam member 553 is a plate-shaped member having a substantially crescent shape. The cam member 553 has a first cam receiving part 553*a* at one end in a circumferential direction and a second cam receiving part 553*b* at the other end.

For example, the cam member 553 is externally fitted and fixed to the transmission shaft 56 at a position shifted in the X direction from a position where the switch gear G is externally fitted and fixed. Note that in the present embodiment, the cam member 553 is externally fitted and fixed between the C pin toothless gear 110 and the B pin toothless gear 210. That is, the cam member 553 is provided coaxially with the switch gear G and rotates around the transmission shaft 56 as a central axis together with the switch gear G with the rotation of the transmission shaft 56.

Note that the cam member 553 may be provided integrally with the switch gear G. In addition, the cam member 553 may be provided integrally with at least one of the C pin toothless gear 110 and the B pin toothless gear 210.

As illustrated in FIG. 16B, in a state in which a tooth part G1 of the switch gear G meshes with the drive side rack part 222 of the B pin rack bar 220B, the first cam receiving part 553*a* of the cam member 553 is positioned on the + side in the Y direction from the first projection 551.

That is, the first cam receiving part 553*a* and the first projection 551 face each other via a slight gap in the Y direction. In this state, even if external force (external force Fa in FIG. 16B) acts on the C pin rack bar 120 toward the + side in the Y direction, the external force is absorbed by the gap.

When larger external force Fa is applied to the C pin rack bar 120 toward the + side in the Y direction, the C pin rack bar 120 moves from a position illustrated by a two-dot chain line in FIG. 16B to a position illustrated by a solid line. In this state, the first projection 551 abuts on the first cam receiving part 553*a*, and the movement of the C pin rack bar 120 toward the + side in the Y direction is prevented.

In addition, as illustrated in FIG. 16C, in a state in which the tooth part G1 of the switch gear G meshes with the input side rack part 121 of the C pin rack bar 120, the second cam receiving part 553*b* of the cam member 553 is positioned on the + side in the Y direction of the second projection 552. That is, the second cam receiving part 553*b* and the second projection 552 face each other via a slight gap in the Y direction. In this state, even if external force on the + side in the Y direction (external force Fb in FIG. 16C) is applied to the B pin rack bar 220B, the external force is absorbed by the gap.

When larger external force Fb is applied to the B pin rack bar 220B toward the + side in the Y direction, the B pin rack bar 220B moves from a position illustrated by a two-dot chain line in FIG. 16C to a position illustrated by a solid line in the + side in the Y direction. In this state, the second projection 552 abuts on the second cam receiving part 553*b*, and the movement of the B pin rack bar 220B toward the + side in the Y direction is prevented.

<Operation of Cylinder Connection Module 100 and Boom Connection Module 200>

Referring to FIGS. 17A to 17C and FIGS. 18A to 18C, an example of operation of the cylinder connection module 100 and the boom connection module 200 will be described. The operation illustrated in FIGS. 17A to 17C and FIGS. 18A to 18C is, for example, the removal operation of the cylinder connection module 100 and the boom connection module 200 in a case where the distal end boom 31 is extended.

Hereinafter, the rotation of the electric motor 51 when the boom connection module 200 is changed from the inserted state to the removed state is referred to as "forward rotation", and the rotation of the electric motor 51 when the cylinder connection module 100 is changed from the inserted state to the removed state is referred to as "reverse rotation".

Figure 17A:
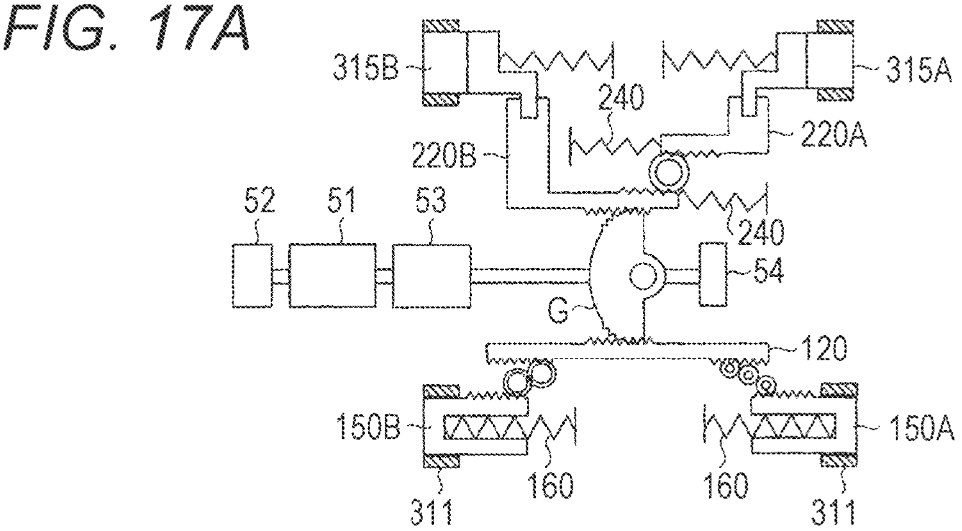
FIGS. 17A to 17C are schematic views for describing the operation of the cylinder connection module.
Figure 17B:
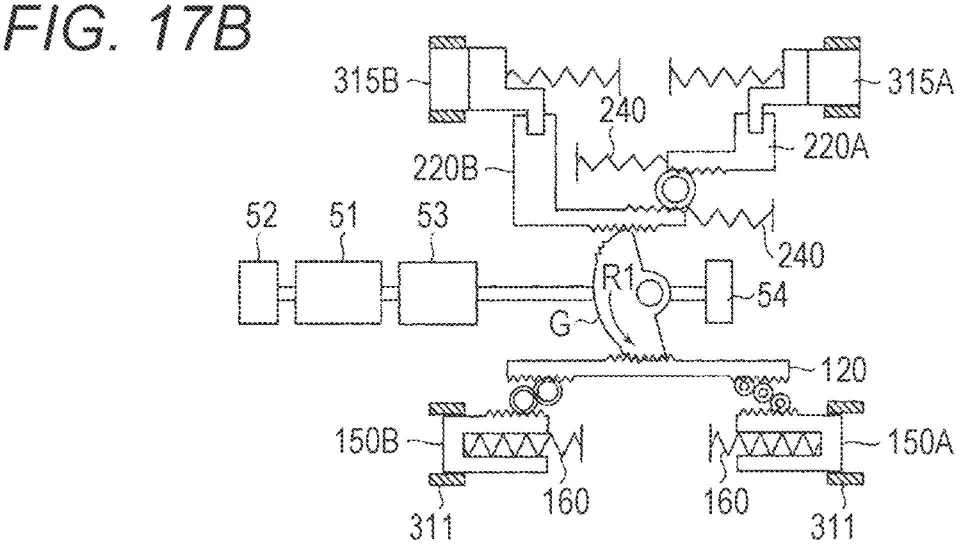
Figure 17C:
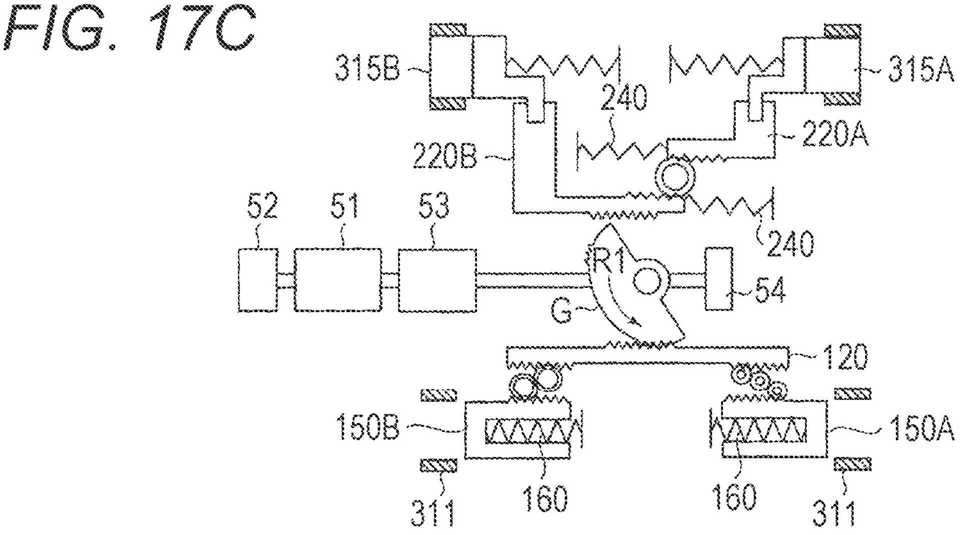

FIGS. 17A to 17C are schematic views for describing the operation of the cylinder connection module 100. FIGS. 17A to 17C illustrate operation in a case where the cylinder connection module 100 changes from the inserted state to the removed state. In FIGS. 17A to 17C, the C pin toothless gear 110 and the B pin toothless gear 210 are illustrated as the integrally formed switch gear G. In addition, in FIGS. 17A to 17C, the lock mechanism 55 is omitted.

As illustrated in FIG. 17A, in a contracted state of the distal end boom 31 before being extended, the cylinder connection module 100 is in the neutral state. That is, the C pin 150 is engaged with the C pin receiving part 311 of the distal end boom 31, and the distal end boom 31 and the cylinder connection module 100 are in a connection state.

In a case where the cylinder connection module 100 changes from the inserted state to the removed state, the power of the electric motor 51 is transmitted to the C pins 150A and 150B through the following first path and second path.

The first path is the C pin toothless gear 110→the C pin rack bar 120→the first gear group 130→the one C pin 150A. The second path is the C pin toothless gear 110→the C pin rack bar 120→the second gear group 140→the other C pin 150B.

As illustrated in FIG. 17B, when the electric motor 51 performs reverse rotation, the C pin toothless gear 110 rotates in the R1 direction. With the rotation of the C pin toothless gear 110, the C pin rack bar 120 is displaced to the + side in the Y direction (right side in FIGS. 17A to 17C). Accordingly, in the first path, the one C pin 150A is displaced to the − side in the Y direction (left side in FIGS. 17A to 17C) via the first gear group 130. In the second path, the other C pin 150B is displaced to the + side in the Y direction (right side in FIGS. 17A to 17C) via the second gear group 140. That is, when the cylinder connection module 100 changes from the inserted state to the removed state, the one C pin 150A and the other C pin 150B are displaced in directions approaching each other.

Finally, as illustrated in FIG. 17C, the C pins 150A and 150B are completely detached from the C pin receiving part 311, and the cylinder connection module 100 and the distal end boom 31 are brought into a disconnection state. Note that a state change of the cylinder connection module 100 from the removed state to the inserted state is automatically performed on the basis of the biasing force of the C pin biasing mechanism 160.

Figure 18A:
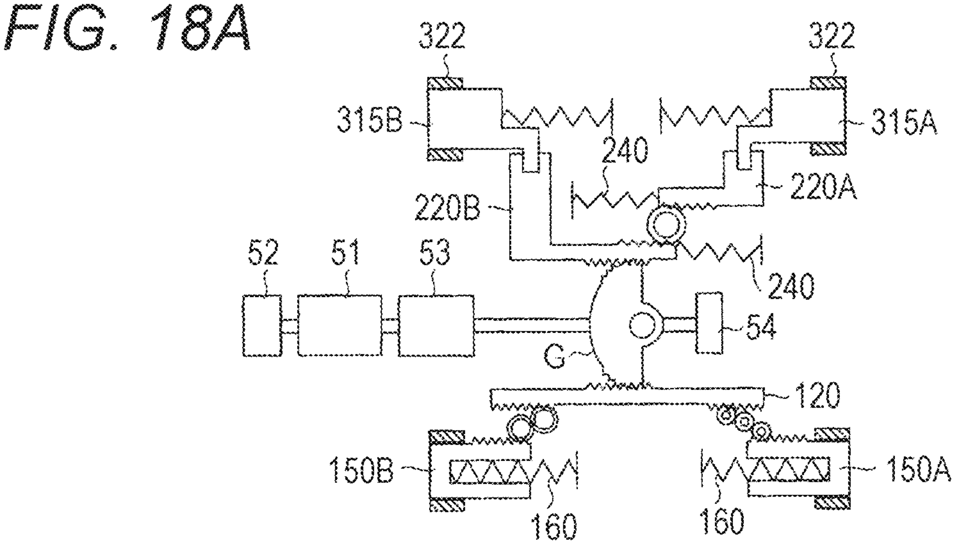
FIGS. 18A to 18C are schematic views for describing the operation of the boom connection module.
Figure 18B:
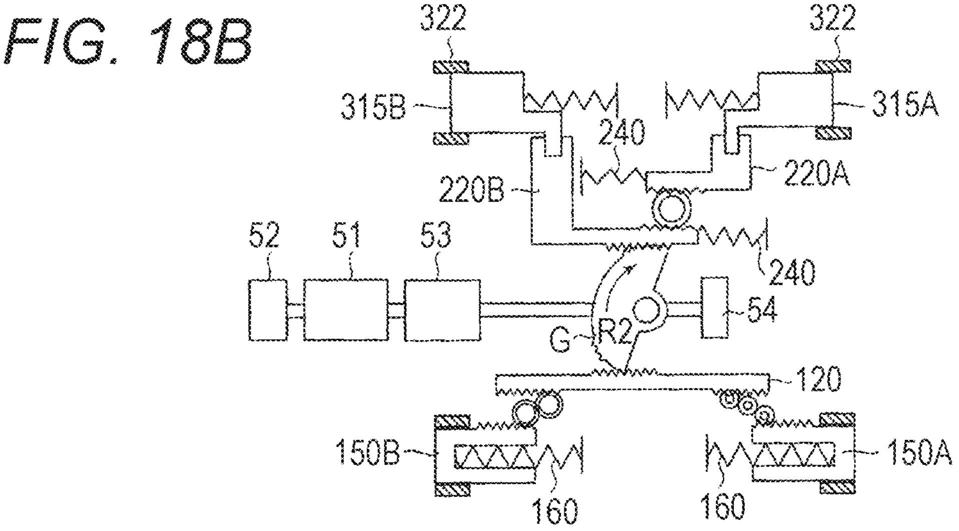
Figure 18C:
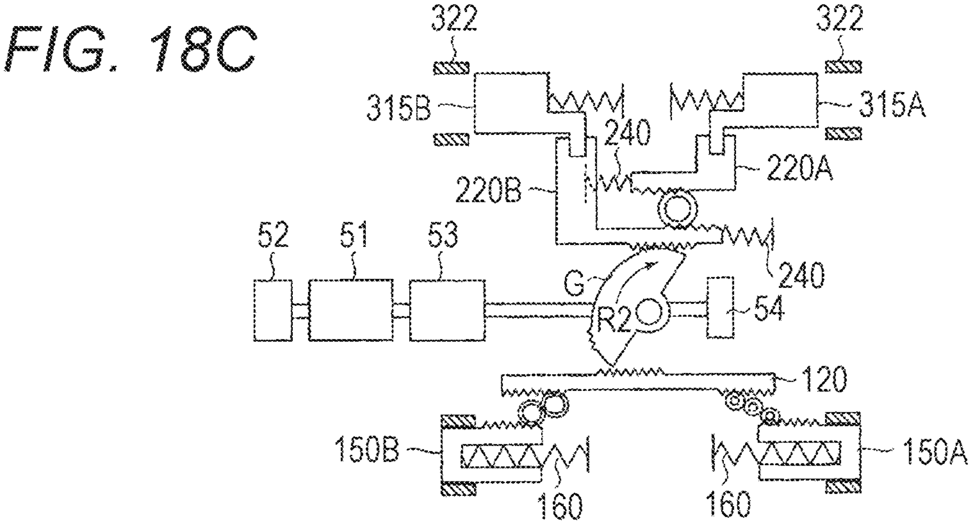

FIGS. 18A to 18C are schematic views for describing the operation of the boom connection module 200. FIGS. 18A to 18C illustrate operation in a case where the boom connection module 200 changes from the inserted state to the removed state. In FIGS. 18A to 18C, the C pin toothless gear 110 and the B pin toothless gear 210 are illustrated as the integrally formed switch gear G. In addition, in FIGS. 18A to 18C, the lock mechanism 55 is omitted.

As illustrated in FIG. 18A, in the contracted state of the distal end boom 31 before being extended, the cylinder connection module 100 and the boom connection module 200 are in the neutral state. That is, the distal end boom 31 is connected to the intermediate boom 32 via the B pin 315 and is not movable in the telescoping direction with respect to the intermediate boom 32.

In a case where the boom connection module 200 changes from the inserted state to the removed state, the power of the electric motor 51 is transmitted through a path of the B pin toothless gear 210→the one B pin rack bar 220B→the synchronous gear 230→the other B pin rack bar 220A.

As illustrated in FIG. 18B, when the electric motor 51 performs forward rotation, the B pin toothless gear 210 rotates in the R2 direction. With the rotation of the B pin toothless gear 210, the one B pin rack bar 220B is displaced to the + side in the Y direction (right side in FIGS. 18A to 18C). In addition, the synchronous gear 230 rotates, and the other B pin rack bar 220A is displaced to the − side in the Y direction (left side in FIGS. 18A to 18C) in response to the rotation of the synchronous gear 230. That is, when the boom connection module 200 changes from the inserted state to the removed state, the one B pin rack bar 220B and the other B pin rack bar 220A are displaced in directions approaching each other. As a result, the B pin holding part 314 connected to the B pin rack bars 220A and 220B also contracts, and the B pin 315 held by the B pin holding part 314 is gradually removed from the proximal end side B pin receiving part 322.

Finally, as illustrated in FIG. 18C, the B pins 315A and 315B are completely detached from the proximal end side B pin receiving part 322, and the distal end boom 31 and the intermediate boom 32 are brought into the disconnection state. Note that a state change of the boom connection module 200 from the removed state to the inserted state is automatically performed on the basis of the biasing force of the B pin biasing mechanism 240.

<Control During Telescoping Operation>

Figure 19:
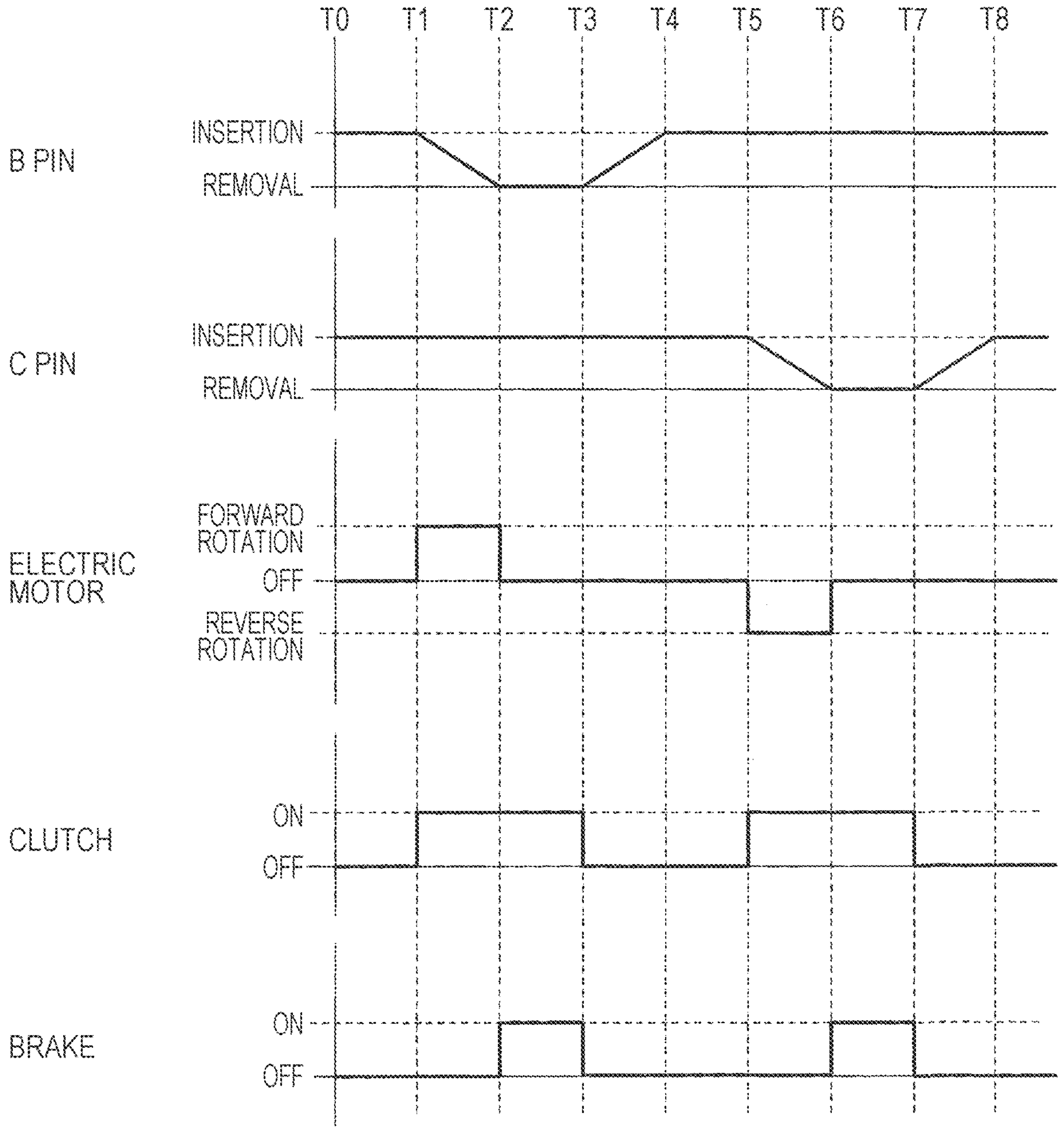
FIG. 19 is a timing chart illustrating an example of control during the extending operation of the telescopic boom.

FIG. 19 is a timing chart illustrating an example of control during the extending operation of the telescopic boom 30. For convenience, a case where the distal end boom 31 is extended from a fully retracted state will be described. Note that the inserted state and the removed state of the B pin 315 correspond to the inserted state and the removed state of the boom connection module 200, respectively and the inserted state and the removed state of the C pin 150 correspond to the inserted state and the removed state of the cylinder connection module 100, respectively. Switching between on and off of the electric motor 51, the brake 52, and the clutch 61 is controlled by the control device 70.

Sections T0 to T1 in FIG. 19 are initial contracted states of the extending operation, and the cylinder connection module 100 and the boom connection module 200 are in the neutral state (see FIGS. 17A and 18A). That is, the distal end boom 31 is connected to the intermediate boom 32 via the B pin 315 and is not movable in the telescoping direction with respect to the intermediate boom 32. In addition, the C pin 150 is engaged with the C pin receiving part 311 of the distal end boom 31, and the distal end boom 31 and the cylinder part 42 are in a connection state.

States of respective mechanical elements in the sections T0 to T1 are as follows.

Electric motor 51: Off
Clutch 61: Off
Brake 52: Off
C pin 150 (cylinder connection module 100): Inserted state
B pin 315 (boom connection module 200): Inserted state When receiving the extension operation of the telescopic boom 30 by the operator (timing T1), the control device 70 controls the clutch 61 to bring the clutch 61 into an on state (connected state) and causes the electric motor 51 to perform forward rotation. The B pin 315 gradually changes from the inserted state to the removed state.

States of respective mechanical elements in the sections T1 to T2 are as follows.

Electric motor 51: On
Clutch 61: On
Brake 52: Off
C pin 150 (cylinder connection module 100): Inserted state
B pin 315 (boom connection module 200): Inserted state→Removed state (removal operation)

At this time, when the B pin 315 is difficult to remove, for example, due to being caught by the proximal end side B pin receiving part 322 of the intermediate boom 32, rotating elements in the power transmission path from the electric motor 51 to the boom connection module 200 cannot rotate smoothly, and an overload occurs. Then, there is a risk that a large current flows through the electric motor 51, resulting in heat generation and burnout.

In the present embodiment, the torque limiter 63 is disposed in the power transmission path, and a load acting on the mechanical element in the power transmission path is maintained at a predetermined value or less. Therefore, it is possible to prevent the mechanical element from being damaged due to difficulty in removal of the B pin 315 during the removal operation of the B pin 315.

The control device 70 determines a state of the B pin 315 on the basis of the detection result of the position detection device 54 and the like, and when the B pin 315 changes to the removed state (timing T2), the control device 70 stops the electric motor 51 while maintaining the clutch 61 in an on state. In addition, the brake 52 is turned on to maintain the removed state of the B pin 315.

Note that timing to turn off the electric motor 51 and timing to turn on the brake 52 are appropriately controlled by the control device 70. For example, by turning on the brake 52 and then turning off the electric motor 51, it is possible to reliably maintain the removed state of the B pin 315.

At timing T2, the B pin 315 is completely detached from the proximal end side B pin receiving part 322, and the distal end boom 31 and the intermediate boom 32 are brought into the disconnection state. Although not illustrated, in sections T2 to T3, the control device 70 controls the telescoping actuator 40 to move the cylinder part 42 in the extending direction. Accordingly, the distal end boom 31 connected to the cylinder part 42 via the cylinder connection module 100 moves in the extending direction.

States of respective mechanical elements in the sections T2 to T3 are as follows.

Electric motor 51: Off
Clutch 61: On
Brake 52: On
C pin 150 (cylinder connection module 100): Inserted state
B pin 315 (boom connection module 200): Removed state When the distal end boom 31 moves to a predetermined position and is brought into the extended state (timing T3), the control device 70 controls the clutch 61 and the brake 52 to bring the clutch 61 and the brake 52 into an off state. The boom connection module 200 is restored to the neutral state by the biasing force of the B pin biasing mechanism 240. Accordingly, the B pin 315 changes from the removed state to the inserted state and is inserted into the distal end side B pin receiving part 323.

States of respective mechanical elements in sections T3 to T4 are as follows.

Electric motor 51: Off
Clutch 61: Off
Brake 52: Off
C pin 150 (cylinder connection module 100): Inserted state
B pin 315 (boom connection module 200): Removed state→Inserted state (insertion operation)

As described above, in the insertion operation of the B pin 315, the boom connection module 200 is restored to the neutral state using the B pin biasing mechanism 240. In this case, when the power transmission path from the electric motor 51 to the boom connection module 200 is connected, the electric motor 51 rotates in a direction opposite to the rotation direction during the removal operation in accordance with the insertion operation of the B pin 315. Then, the rotating elements including the electric motor 51 may not stop at the neutral position due to inertial force, and thrust for rotating the switch gear G in a direction in which the C pin 150 is removed due to overrun may be generated.

In this regard, in the present embodiment, the clutch 61 is disposed in the power transmission path, and the transmission of power from the boom connection module 200 to the electric motor 51 is cut off when the boom connection module 200 is restored to the neutral state using the B pin biasing mechanism 240. Therefore, during the insertion operation of the B pin 315, it is possible to prevent the C pin 150 from changing to the removed state temporarily and becoming unstable in operation.

When the B pin 315 is completely engaged with the distal end side B pin receiving part 323 (timing T4), the control device 70 changes the C pin 150 to the removed state in order to return the telescoping actuator 40 to a contracted state. That is, at timing T5, the control device 70 controls the clutch 61 to bring the clutch 61 into the on state (connected state) and causes the electric motor 51 to perform reverse rotation. The C pin 150 gradually changes from the inserted state to the removed state.

States of respective mechanical elements in the sections T5 to T6 are as follows.

Electric motor 51: On
Clutch 61: On
Brake 52: Off
C pin 150 (cylinder connection module 100): Inserted state→Removed state (removal operation)
B pin 315 (boom connection module 200): Inserted state At this time, when the C pin 150 is difficult to remove, for example, due to being caught by the C pin receiving part 311 of the distal end boom 31, the rotating elements in the power transmission path from the electric motor 51 to the cylinder connection module 100 cannot smoothly rotate, and an overload occurs. Then, there is a risk that a large current flows through the electric motor 51, resulting in heat generation and burnout.

In the present embodiment, the torque limiter 63 is disposed in the power transmission path, and a load acting on the mechanical element in the power transmission path is maintained at a predetermined value or less. Therefore, it is possible to prevent the mechanical element from being damaged due to difficulty in removal of the C pin 150 during the removal operation of the C pin 150.

The control device 70 determines a state of the C pin 150 on the basis of the detection result of the position detection device 54 and the like, and when the C pin 150 changes to the removed state (timing T6), the control device 70 stops the electric motor 51 while maintaining the clutch 61 in the on state. In addition, the brake 52 is brought into an on state, and the C pin 150 is maintained in the removed state.

At timing T6, the C pin 150 is completely detached from the C pin receiving part 311 of the distal end boom 31, and the cylinder connection module 100 and the distal end boom 31 are brought into a disconnection state. Although not illustrated, in sections T6 to T7, the control device 70 controls the telescoping actuator 40 to move the cylinder part 42 in a contraction direction. At this time, since the cylinder part 42 is in a disconnection state with respect to the distal end boom 31, the intermediate boom 32, and the proximal end boom 33, the cylinder part 42 moves alone in the contraction direction.

States of respective mechanical elements in the sections T6 to T7 are as follows.

Electric motor 51: Off
Clutch 61: On
Brake 52: On
C pin 150 (cylinder connection module 100): Removed state
B pin 315 (boom connection module 200): Inserted state When the telescoping actuator 40 is brought into the contracted state (timing T7), the control device 70 controls the clutch 61 and the brake 52 to bring the clutch 61 and the brake 52 into the off state. The cylinder connection module 100 is restored to the neutral state by the biasing force of the C pin biasing mechanism 160. Accordingly, the C pin 150 changes from the removed state to the inserted state and engages with the C pin receiving part 321 of the intermediate boom 32. In addition, the B pin holding part 324 of the intermediate boom 32 is engaged with the B pin rack bars 220A and 220B.

States of respective mechanical elements in sections T7 to T8 are as follows.

Electric motor 51: Off

Clutch 61: Off

Brake 52: Off

C pin 150 (cylinder connection module 100): Removed state→Inserted state (insertion operation)

B pin 315 (boom connection module 200): Inserted state

As described above, in the insertion operation of the C pin 150, the cylinder connection module 100 is restored to the neutral state using the C pin biasing mechanism 160. In this case, when the power transmission path from the electric motor 51 to the cylinder connection module 100 is connected, the electric motor 51 rotates in a direction opposite to the rotation direction during the removal operation in accordance with the insertion operation of the C pin 150. Then, the rotating elements including the electric motor 51 may not stop at the neutral position due to inertial force, and thrust for rotating the switch gear G in a direction in which the B pin 325 is removed due to overrun may be generated.

In this regard, in the present embodiment, the clutch 61 is disposed in the power transmission path, and the transmission of power from the cylinder connection module 100 to the electric motor 51 is cut off when the cylinder connection module 100 is restored to the neutral state using the C pin biasing mechanism 160. Therefore, it is possible to prevent the B pin 325 from changing to the removed state temporarily during the insertion operation of the C pin 150 and becoming unstable in operation.

When the C pin 150 is completely engaged with the C pin receiving part 321 of the intermediate boom 32 (timing T8), the neutral state is maintained. Note that in a case where the intermediate boom 32 is extended, operation similar to the operation described above is performed. In addition, in a case where the distal end boom 31 or the intermediate boom 32 is contracted, operation in a direction opposite to a direction described above is performed.

Here, lubricant oil is generally applied to the mechanical elements constituting the pin insertion/removal actuator 50 so that the removal operation and the insertion operation of the B pin 315 and the C pin 150 are smoothly performed. In this case, if the viscosity of the lubricant oil increases due to ambient environmental temperature or aging, the insertion and removal operation of the B pin 315 and the C pin 150 may be hindered. In particular, since the insertion operation of the B pin 315 and the C pin 150 is performed using the biasing force, the lubricant oil of high viscosity may become resistance and operation time may become unstable.

Therefore, in the present embodiment, when the C pin 150 is restored to the inserted state by the biasing force of the C pin biasing mechanism 160 and when the B pin 315 is restored to the inserted state by the biasing force of the B pin biasing mechanism 240, the control device 70 executes motor assist processing of operating the electric motor 51.

Figure 20:
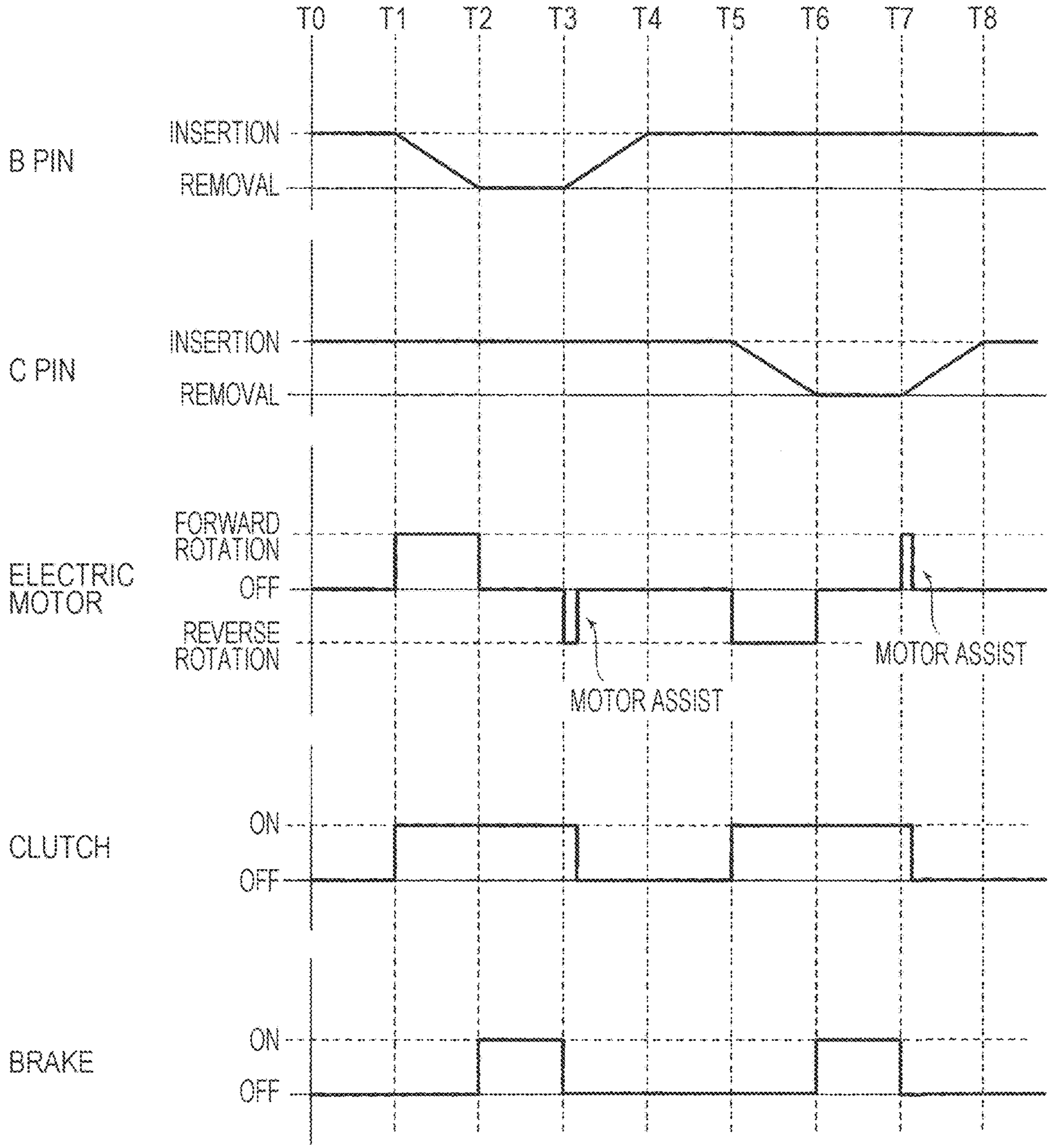
FIG. 20 is a timing chart illustrating an example of control during the extending operation of the telescopic boom to which motor assist processing is applied.

FIG. 20 is a timing chart for describing the extending operation of the telescopic boom 30 to which the motor assist processing is applied.

As illustrated in FIG. 20, in a case where the insertion operation of the B pin 315 is performed in the sections T3 to T4, the control device 70 causes the electric motor 51 to perform reverse rotation for a short period of time (for example, 0.01 to 0.5 sec.). In addition, in a case where the insertion operation of the C pin 150 is performed in the sections T7 to T8, the control device 70 causes the electric motor 51 to perform forward rotation. As a result, it is possible to release a state in which the C pin 150 or the B pin 315 is difficult to move due to the viscosity of the lubricant oil by the power of the electric motor 51, and thereafter it is possible to smoothly restore to the neutral state by the subsequent biasing force of the C pin biasing mechanism 160 or the B pin biasing mechanism 240.

This motor assist processing may be always performed during the insertion operation of the B pin 315 and the C pin 150 or may be performed only in a case where a predetermined condition is satisfied. The predetermined condition includes ambient environmental temperature (for example, −10° C. or less), use time, and the like. In addition, the operator may manually set whether to perform the motor assist processing. In addition, the motor assist processing may be selectively performed on the B pin 315 and the C pin 150.

Furthermore, the control device 70 may determine the drive start timing and drive time of the electric motor 51 in the motor assist processing according to the environmental temperature. As a result, since appropriate motor assist processing is performed, it is possible to prevent thrust from being generated in a direction in which the C pin 150 or the B pins 315 and 325 are removed due to overrun.

As described above, the mobile crane 1 (work machine) according to the present embodiment includes: the telescopic boom 30 having the first boom (for example, the distal end boom 31) and the second boom (for example, the intermediate boom 32) that overlap each other in a telescopic manner; the telescoping actuator 40 that moves the first boom in the telescoping direction with respect to the second boom; the electric motor 51 (electrical drive source) provided in the cylinder part 42 (movable portion) of the telescoping actuator 40; the C pin 150 (first fixing pin) that connects the telescoping actuator 40 and the first boom; the cylinder connection module 100 (first connection mechanism) that operates on the basis of power of the electric motor 51 and switches between a connection state and a disconnection state between the telescoping actuator 40 and the first boom by inserting and removing the C pin 150; the B pins 315 and 325 (second fixing pins) that connect the first boom and the second boom; the boom connection module 200 (second connection mechanism) that operates on the basis of the power of the electric motor 51 and switches between a connection state and a disconnection state between the first boom and the second boom by inserting and removing the B pins 315 and 325; and the torque limiter 63 that is disposed between the electric motor 51 and the cylinder connection module 100 or the boom connection module 200, the torque limiter 63 maintaining, at a predetermined value or less, a load acting on the mechanical element constituting the power transmission path from the electric motor 51 to the cylinder connection module 100 or the boom connection module 200.

Specifically, in the mobile crane 1, the electric motor 51 (electrical drive source) includes a rotary electric motor, and the torque limiter 63 is a friction torque limiter that is attached to the transmission shaft 56 of the power transmission path and in which an input side element and an output side element are joined together while sliding when a load larger than the predetermined value is generated.

According to the mobile crane 1, since the cylinder connection module 100 and the boom connection module 200 are electric, it is not necessary to provide a hydraulic circuit as in conventional structures in the internal space of the telescopic boom 30. Therefore, it is possible to improve the degree of freedom in terms of design in the internal space of the telescopic boom 30 by effectively utilizing a space used by the hydraulic circuit.

In addition, the torque limiter 63 is disposed in the power transmission path, and a load acting on the mechanical element in the power transmission path is maintained at a predetermined value or less. Thus, it is possible to prevent the mechanical element from being damaged due to difficulty in removal of the C pin 150 and the B pin 315 and 325 during the removal operation of the C pin 150 and the B pin 315 and 325.

Therefore, according to the mobile crane 1, it is possible to improve the degree of freedom in terms of design around the telescopic boom 30 and an increase in the reliability when the boom 30 is telescoping.

In addition, the mobile crane 1 includes the speed reducer 62 that decelerates a driving speed of the electric motor 51 (electrical drive source) and outputs the decelerated driving speed, and the torque limiter 63 is disposed in the stage following the speed reducer 62 in the power transmission path. As a result, it is possible to reduce influence of tolerances and variations of the torque setting value as compared with a case where the torque limiter 63 is disposed in the stage preceding the speed reducer 62.

In addition, the mobile crane 1 includes the speed reducer 62 that decelerates a driving speed of the electric motor 51 (electrical drive source) and outputs the decelerated driving speed, and the torque limiter 63 may be disposed in the stage preceding the speed reducer 62 in the power transmission path. As a result, since the torque setting value is decreased, it is possible to downsize the torque limiter 63.

Although the invention made by the present inventors has been specifically described above on the basis of the embodiment, the present invention is not limited to the embodiment described above, and can be modified without departing from the gist thereof.

For example, as the electric motor 51, a hollow motor having a hollow stator disposed on the inner side and a rotor disposed on the outer side may be applied, the hollow motor may be disposed on the outer periphery of the piston rod part 41, and a transmission gear (not illustrated) of the transmission mechanism 53 may mesh with a gear provided on the rotor.

In addition, the disposition of the electric motor 51 described in the embodiment is an example, and the electric motor 51 may be disposed so that the output shaft (not illustrated) extends in the Y direction or the Z direction.

In addition, the electric motor 51 is not limited to the rotary motor, and a linear motor (linear motion actuator) that outputs linear motion can also be used.

In addition, the work machine according to the present invention is not limited to the mobile crane and can also be applied to other work machines (for example, a vehicle for work at height) including a telescopic boom.

It should be understood that the embodiment disclosed herein is illustrative in all respects and not restrictive. The scope of the present invention is indicated not by the description above but by the claims, and it is intended that meanings equivalent to the claims and all modifications within the scope are included.

REFERENCE SIGNS LIST

1 Mobile crane (work machine)
30 Telescopic boom
31 Distal end boom
311 C pin receiving part
314 B pin holding part
315, 315A, 315B B pin
32 Intermediate boom
321 C pin receiving part
322 Proximal end side B pin receiving part
323 Distal end side B pin receiving part
324 B pin holding part
325 B pin
33 Proximal end boom
A Telescopic device
Telescoping actuator
41 Piston rod part
42 Cylinder part (movable portion)
50 Pin insertion/removal actuator
51 Electric motor (electrical drive source)
52 Brake
53 Transmission mechanism
54 Position detection device
55 Lock mechanism
56 Transmission shaft
61 Clutch
62 Speed reducer
63 Torque limiter
100 Cylinder connection module (first connection mechanism)
110 C pin toothless gear
120 C pin rack bar
130 First gear group
140 Second gear group
150, 150A, 150B C pin
160 C pin biasing mechanism (first biasing mechanism)
200 Boom connection module (second connection mechanism)
210 B pin toothless gear
220A, 220B B pin rack bar
230 Synchronous gear
240 B pin biasing mechanism (second biasing mechanism)

The invention claimed is:

1. A work machine comprising:

a telescopic boom having a first boom and a second boom that are telescopically overlapped;

a telescoping actuator that moves the first boom in a telescoping direction with respect to the second boom, the telescoping actuator being a hydraulic cylinder with a movable portion;

a single electrical motor provided in the movable portion of the telescoping actuator;

a first fixing pin that connects the telescoping actuator and the first boom;

a first connection mechanism that operates on a basis of a power of the single electrical motor, the first connection mechanism switching between a connection state and a disconnection state between the telescoping actuator and the first boom by inserting and removing the first fixing pin, and the first connection mechanism being arranged in the movable portion;

a second fixing pin that connects the first boom and the second boom;

a second connection mechanism that operates on the basis of the power of the single electrical motor, the second connection mechanism switching between a connection state and a disconnection state between the first boom and the second boom by inserting and removing the second fixing pin, and the second connection mechanism being arranged in the movable portion together with the first connection mechanism;

a switch gear that transmits the power of the single electrical motor to either one of the first connection mechanism and the second connection mechanism; and a torque limiter that is disposed between the single electrical motor and the switch gear, the torque limiter maintaining, at a predetermined value or less, a load acting on a mechanical element constituting a power transmission path from the single electrical motor to the switch gear, wherein the first connection mechanism and the second connection mechanism are selectively actuated by the single electrical motor.

2. The work machine according to claim 1, wherein the single electrical motor includes a rotary electric motor, and the torque limiter is a friction torque limiter that is attached to a transmission shaft of the power transmission path and in which an input side element and an output side element are joined together while sliding when a load larger than the predetermined value is generated.

3. The work machine according to claim 1, further comprising a speed reducer that decelerates a driving speed of the single electrical motor and outputs the decelerated driving speed, wherein the torque limiter is disposed in a stage following the speed reducer in the power transmission path.

4. The work machine according to claim 1, further comprising a speed reducer that decelerates a driving speed of the single electrical motor and outputs the decelerated driving speed, wherein the torque limiter is disposed in a stage preceding the speed reducer in the power transmission path.

* * * * *